United States Patent
Marcou et al.

(10) Patent No.: US 6,979,777 B2
(45) Date of Patent: Dec. 27, 2005

(54) WEATHERPROOF ELECTRICAL ENCLOSURE HAVING AN ADJUSTABLE-POSITION COVER

(75) Inventors: Jean Claude Marcou, Limoges (FR); Jim Knapik, Huntington, NY (US); Xing Yao, Shanghai (CN)

(73) Assignee: Cooper Wiring Devices, Inc., Peachtree City, GA (US)

( * ) Notice: Subject to any disclaimer, the term of this patent is extended or adjusted under 35 U.S.C. 154(b) by 2 days.

(21) Appl. No.: 10/729,142

(22) Filed: Dec. 4, 2003

(65) Prior Publication Data

US 2005/0082081 A1    Apr. 21, 2005

Related U.S. Application Data

(60) Provisional application No. 60/511,178, filed on Oct. 15, 2003.

(51) Int. Cl.$^7$ ............................................. H02G 3/18
(52) U.S. Cl. ..................... 174/50; 174/58; 174/63; 174/66; 220/241; 220/4.02
(58) Field of Search ............................. 174/50, 58, 63, 174/17 R, 66, 67; 220/4.02, 3.8, 241, 242; 439/535; 248/906

(56) References Cited

U.S. PATENT DOCUMENTS

| 1,400,824 | A | * | 12/1921 | Knoderer | 220/241 |
|---|---|---|---|---|---|
| 3,424,332 | A | * | 1/1969 | Pimentel | 220/3.6 |
| 3,955,701 | A | * | 5/1976 | Fisch | 220/3.7 |
| 3,965,287 | A | * | 6/1976 | Mueller | 174/66 |
| 4,032,030 | A | * | 6/1977 | Bass et al. | 220/3.8 |
| 4,266,683 | A | * | 5/1981 | Sellinger | 220/3.2 |
| 4,469,238 | A | * | 9/1984 | Ranalli | 220/254.3 |
| 4,569,458 | A | * | 2/1986 | Horsley | 220/3.6 |
| 4,740,655 | A | | 4/1988 | Ford | |
| 4,803,307 | A | | 2/1989 | Shotey | |
| 4,874,906 | A | | 10/1989 | Shotey | |
| 4,915,638 | A | | 4/1990 | Domian | |
| 4,950,842 | A | | 8/1990 | Menninga | |
| 4,979,634 | A | | 12/1990 | Begley | |
| 4,988,832 | A | | 1/1991 | Shotey | |
| 5,045,640 | A | | 9/1991 | Riceman | |
| 5,171,939 | A | | 12/1992 | Shotey | |
| 5,218,169 | A | | 6/1993 | Riceman | |
| 5,228,584 | A | | 7/1993 | Williams, Jr. | |
| 5,243,135 | A | | 9/1993 | Shotey | |
| 5,245,507 | A | | 9/1993 | Ericksen | |
| 5,280,135 | A | | 1/1994 | Berlin et al. | |
| 5,317,108 | A | | 5/1994 | Prairie, Jr. | |
| 5,362,924 | A | | 11/1994 | Correnti | |
| 5,380,956 | A | | 1/1995 | Loo et al. | |
| 5,387,761 | A | | 2/1995 | Simonis | |

(Continued)

Primary Examiner—Dhiru R. Patel
(74) Attorney, Agent, or Firm—Ostrager Chong Flaherty & Broitman P.C.

(57) ABSTRACT

A weatherproof electrical enclosure having a base and a cover pivotably connected to the base by movable hinge clips. The position of the hinge clips can be adjusted to allow the cover to be oriented to open horizontally or vertically without needing to remove or remount the enclosure. The cover has cable openings at the top and bottom that may be shielded by hoods and may also have a latch mechanism to keep the cover in the closed position. The enclosure may also include a cover plate having ribs that can be selectively removed to create different kinds of apertures that conform to different types of electrical fixtures. The cover plate may have recesses on two diagonally opposite corners and horizontally elongated mounting holes to make it easier to install, position and remove the cover plate from the base.

45 Claims, 23 Drawing Sheets

U.S. PATENT DOCUMENTS

| | | | |
|---|---|---|---|
| 5,456,377 A | 10/1995 | Williams, Jr. | |
| 5,527,993 A | 6/1996 | Shotey et al. | |
| 5,533,637 A | 7/1996 | Williams, Jr. | |
| 5,763,831 A * | 6/1998 | Shotey et al. | 174/67 |
| 5,773,760 A | 6/1998 | Stark et al. | |
| 5,877,450 A * | 3/1999 | Quin | 174/66 |
| 5,965,844 A * | 10/1999 | Lippa | 174/49 |
| 5,979,987 A * | 11/1999 | Rich | 297/411.23 |
| 5,981,875 A | 11/1999 | Kesler et al. | |
| 6,028,268 A | 2/2000 | Stark et al. | |
| 6,133,531 A | 10/2000 | Hayduke et al. | |
| 6,360,493 B1 * | 3/2002 | Torres, III | 52/101 |
| 6,441,307 B1 | 8/2002 | Shotey et al. | |
| 6,576,837 B1 * | 6/2003 | Pimentel | 174/58 |
| 6,608,252 B2 * | 8/2003 | Hurley | 174/58 |
| 6,630,637 B1 * | 10/2003 | Ward et al. | 200/17 R |
| 6,649,838 B1 * | 11/2003 | Lopez, Sr. et al. | 174/67 |
| 6,806,425 B1 * | 10/2004 | O'Neill | 174/66 |
| 6,810,191 B2 * | 10/2004 | Ferris et al. | 385/134 |
| 6,878,878 B2 * | 4/2005 | Westlake | 174/66 |
| 2004/0218884 A1 * | 11/2004 | Ferris et al. | 385/134 |

\* cited by examiner

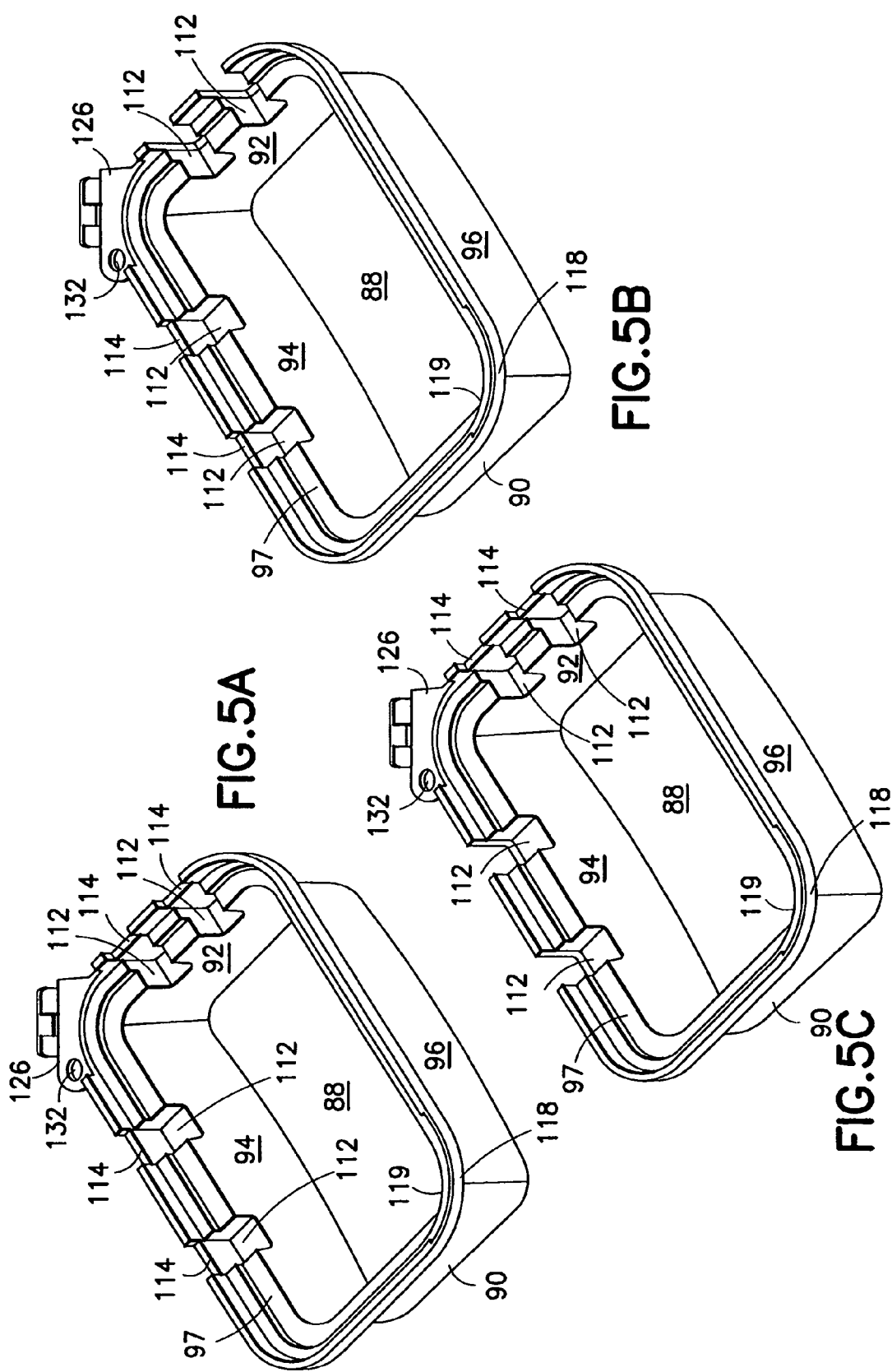

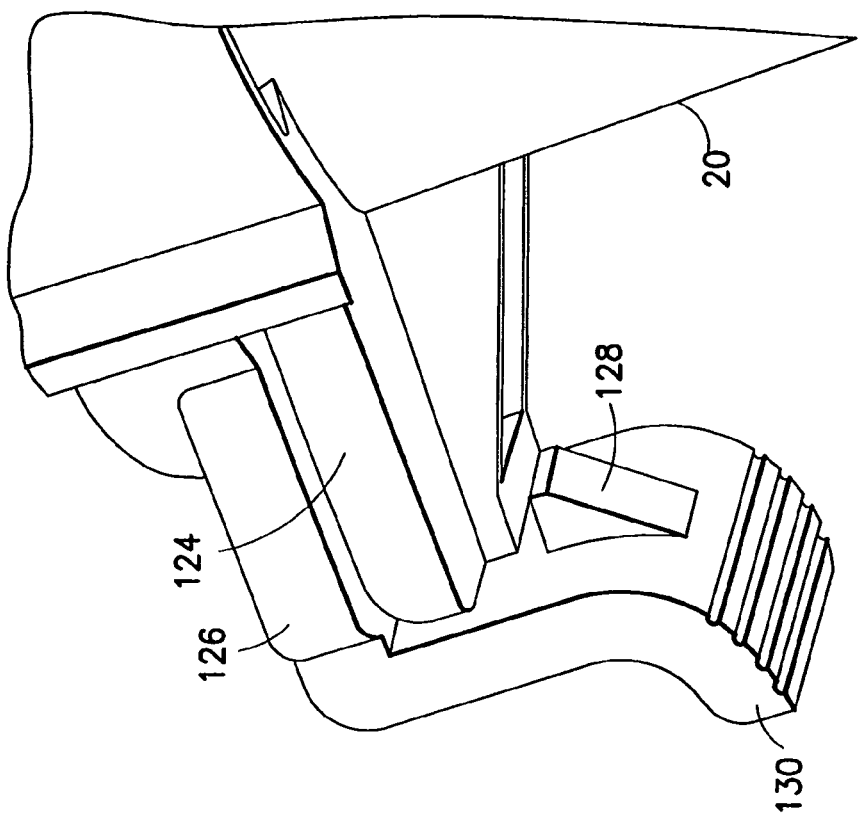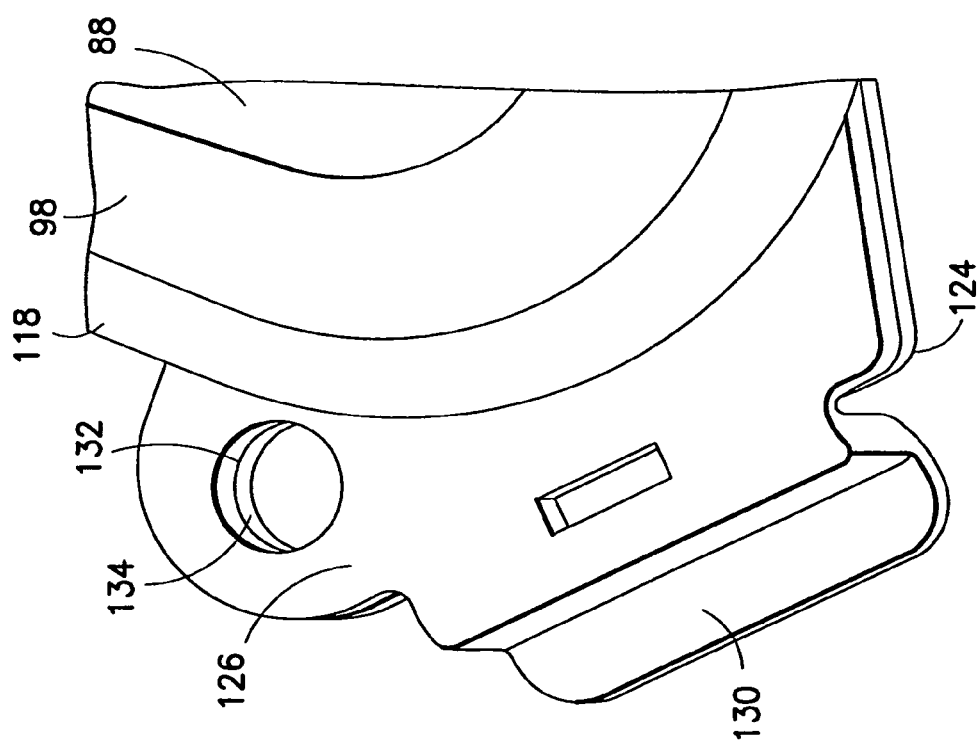

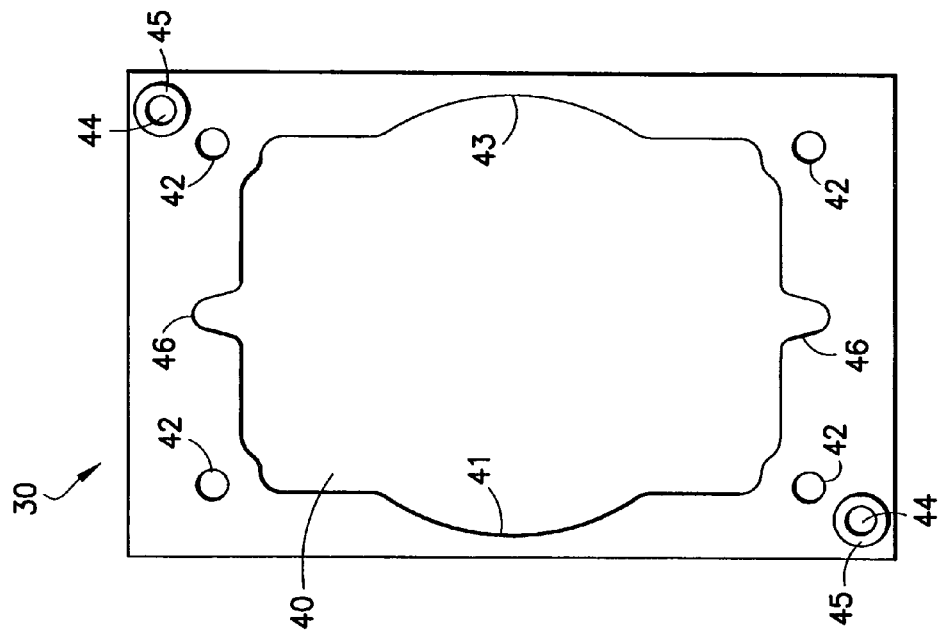
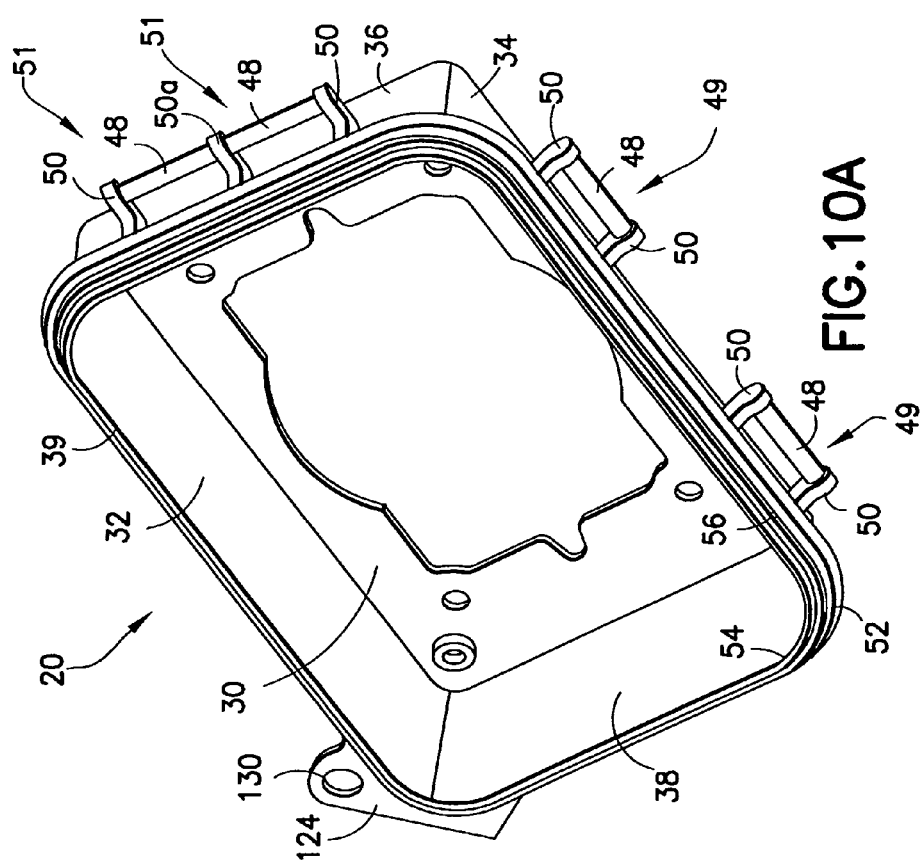

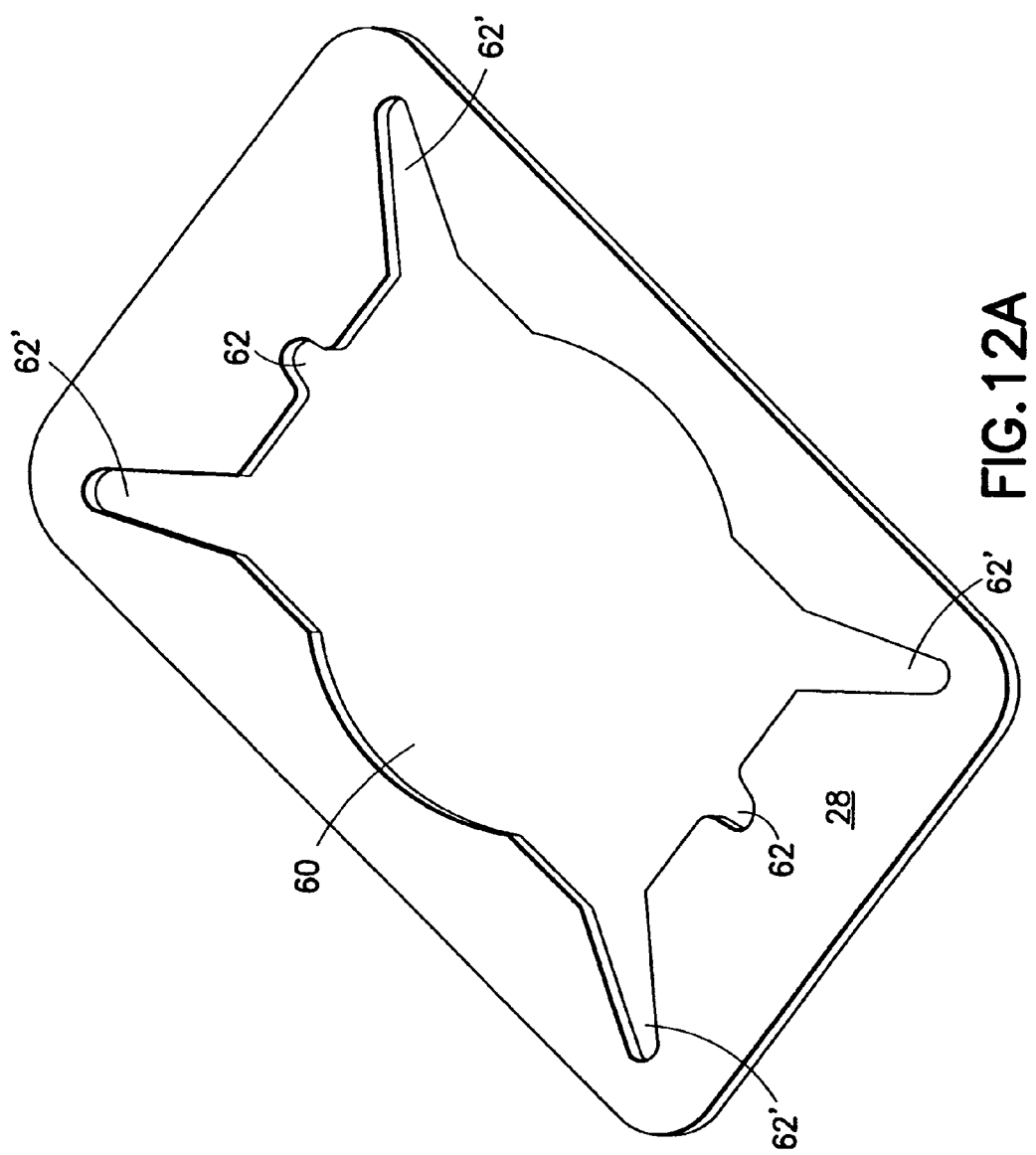

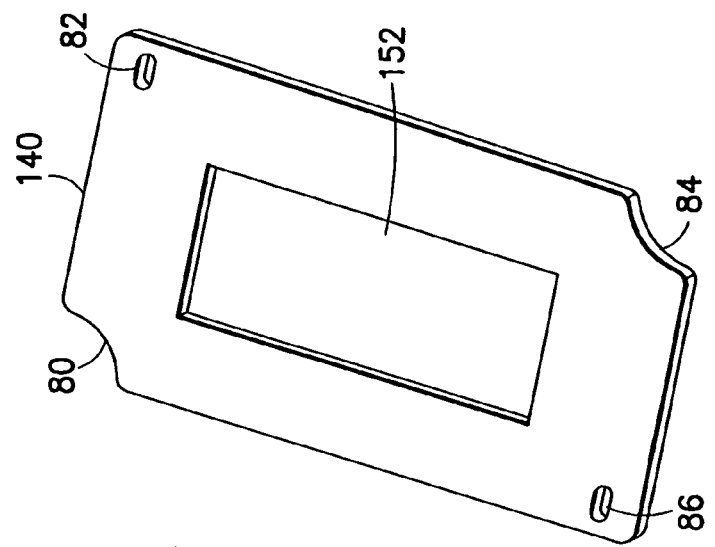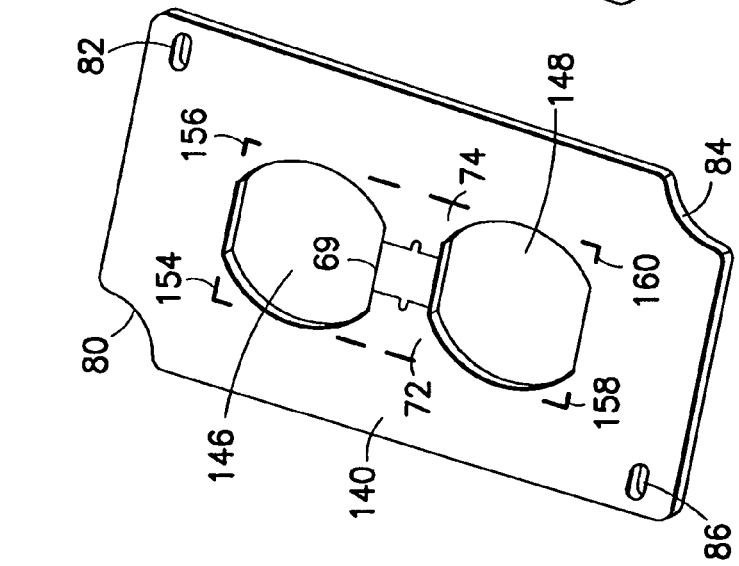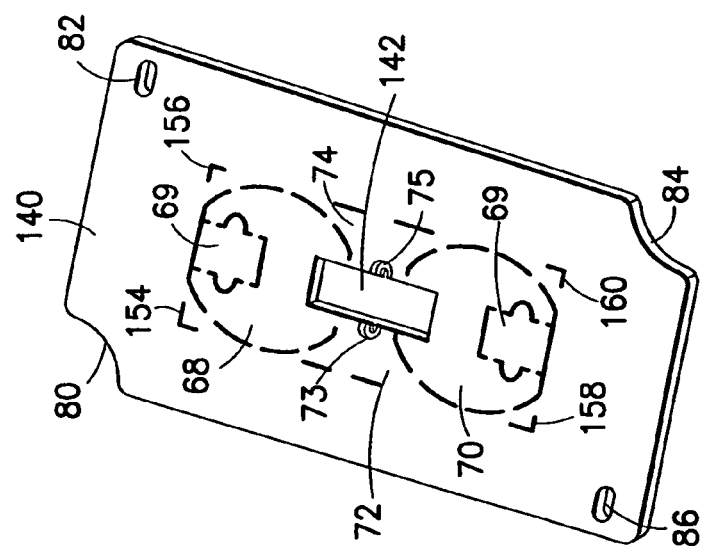

WEATHERPROOF ELECTRICAL ENCLOSURE HAVING AN ADJUSTABLE-POSITION COVER

RELATED APPLICATION

This application claims priority from U.S. Provisional Application Ser. No. 60/511,178 filed on Oct. 15, 2003, the disclosures of which are incorporated herein by reference.

FIELD OF INVENTION

This invention generally relates to enclosures for electrical fixtures such as receptacles and switches. More particularly, it relates to a weatherproof electrical enclosure having an adjustable-position cover.

BACKGROUND OF INVENTION

Weatherproof enclosures for protecting outdoor electrical fixtures such as receptacles and switches against the effects of the elements (e.g., rain, moisture, and dust) are well known. Typically, such enclosures comprise a generally boxed-shaped base that is sized to receive an electrical fixture, and a cover pivotably attached to the base. The enclosure may have openings for electrical cables so that the cover can be closed even when cables are attached to the electrical fixture, e.g., when an electrical plug is attached to a receptacle. Examples of the foregoing enclosures can be found in U.S. Pat. Nos. 6,028,268 and 5,773,760 to Stark et al.; U.S. Pat. Nos. 5,533,637, 5,546,377 and 5,228,584 to Williams, Jr.; U.S. Pat. No. 5,317,109 to Prairie, Jr.; and U.S. Pat. No. 4,915,638 to Domian.

The enclosures of the prior art, however, have a disadvantage in that their covers are typically hinged to pivot open in only one direction. That is, the cover can be pivoted open either horizontally or vertically but not in both directions. As a result, separate inventories of enclosures having vertically opening covers and horizontally opening covers have to be stocked. Another disadvantage of enclosures of the prior art is that once the electrical fixture is covered by or mounted within the enclosure, the direction of the opening of the cover (i.e., its "orientation") cannot be changed without remounting or replacing the entire enclosure.

Information relevant to attempts to solve the foregoing problems can be found in U.S. Pat. No. 6,133,531 to Hayduke et al., U.S. Pat. Nos. 5,763,831 and 6,441,307 to Shotey et al., U.S. Pat. No. 5,280,135 to Berlin et al. and U.S. Pat. No. 4,109,095 to Kling et al. However, each of these has a problem in utilization that makes it relatively unattractive to manufacture or use. For example, some devices incorporate complicated mechanisms that require large numbers of parts. Other devices require the use of relatively large enclosures that occupy a large amount of space. This makes such enclosures unsightly and impractical in situations where space is at a premium. Other devices use multiple hinge assemblies to allow different orientations for the cover. However, these hinge assemblies are designed to be removable. As such, it easy for these hinge assemblies to be accidentally detached.

Accordingly, it is a broad object of the invention to provide a weatherproof electrical enclosure (hereafter, "enclosure") having a cover with movable hinges that allow the cover to be oriented to open horizontally or vertically. Since the hinges are movable, the cover's orientation can be changed even after the enclosure has been mounted over the electrical fixture, thereby obviating the need to remount or replace the enclosure in order to change the orientation of the cover. As such, the cover of the present invention is referred to as having an "adjustable-position cover".

SUMMARY OF INVENTION

In the present invention, the foregoing purposes, as well as others that will be apparent, are achieved generally by providing an enclosure comprising a base and a cover wherein the cover is pivotably connected to the base by a movable hinge clip. In a preferred embodiment, two hinge clips are provided. The hinge clip or clip has a pair of opposing hooks at one end for attaching the clip to the cover. The other end of the hinge clip has a pin hook for attaching the clip to the base. The clip is attached to the cover by respectively mounting one opposing hook to a lip on the cover and the other opposing hook to a mounting rail located on the top or side of the cover. The other end of the clip is attached to the base by hooking the pin hook onto a hinge pin of a mounting assembly located on the top or side of the base. The orientation of the cover can be changed by adjusting the position of the hinge clips. This is accomplished by first removing the cover from the base by unhooking the pin hooks from the hinge pins. The clips are then moved from the top or side of the cover, as the case may be, by sliding the clips off the lip and mounting rail to which they are attached and then sliding them around the corner of the cover and onto the mounting rail and lip on the side or top of the cover, as the case may be. The cover is then re-attached to the base by hooking the clips onto the corresponding hinge pins.

Another feature of the present invention is the use of a cover plate positioned within the base. The cover plate has ribs that can be selectively removed to create different kinds of openings that allow the cover plate to be used with different types of electrical fixtures. Also, the cover plate has a pair of recesses located on diagonally opposite corners and horizontally elongated mounting holes to make it easier to position or remove the cover plate from within the base.

The advantage of the present invention is that it makes it unnecessary to stock separate inventories of enclosures having vertically opening covers and horizontally opening covers. A further advantage of the present invention is that it allows the orientation of the cover to be changed without the need to remount or replace the entire enclosure. Another advantage of the invention is that the use of a cover plate with removable ribs makes it unnecessary to stock cover plates having different kinds of openings to match different types of electrical fixtures. Other objects, features and advantages of the present invention will become apparent when the detailed description of the preferred embodiments of the invention are considered in conjunction with the drawings which should be construed in an illustrative and not limiting sense as follows.

BRIEF DESCRIPTION OF DRAWINGS

FIG. 5A is a perspective view of the bottom of the cover of FIG. 2A with the hinge clips removed.

FIG. 5B is a perspective view of the bottom of the cover of FIG. 5A with cable caps on a bottom wall removed.

FIG. 5C is a perspective view of the bottom of the cover of FIG. 5A with cable caps on a side wall removed.

FIG. 7A is a front perspective view of a latch mechanism of the enclosure in FIG. 1 with the cover in a closed position.

FIG. 7B is a side perspective view of the latch mechanism of FIG. 7A.

FIG. 10A is a front perspective view of a base for use with the enclosure of FIG. 1.

FIG. 10B is a front plan view of a rear wall of the base of FIG. 10A.

FIG. 12A is a front perspective view of a gasket for use with the enclosure of FIG. 1.

FIG. 13A is a front perspective view of the cover plate of FIG. 13 configured for use with an electrical fixture requiring a toggle switch type opening.

FIG. 13B is a front perspective view of the cover plate of FIG. 13 configured for use with a duplex type receptacle.

FIG. 13C is a front perspective view of the cover plate of FIG. 13 configured for use with an electrical fixture requiring a large rectangular opening.

DESCRIPTION OF PREFERRED EMBODIMENTS

Figure 1:
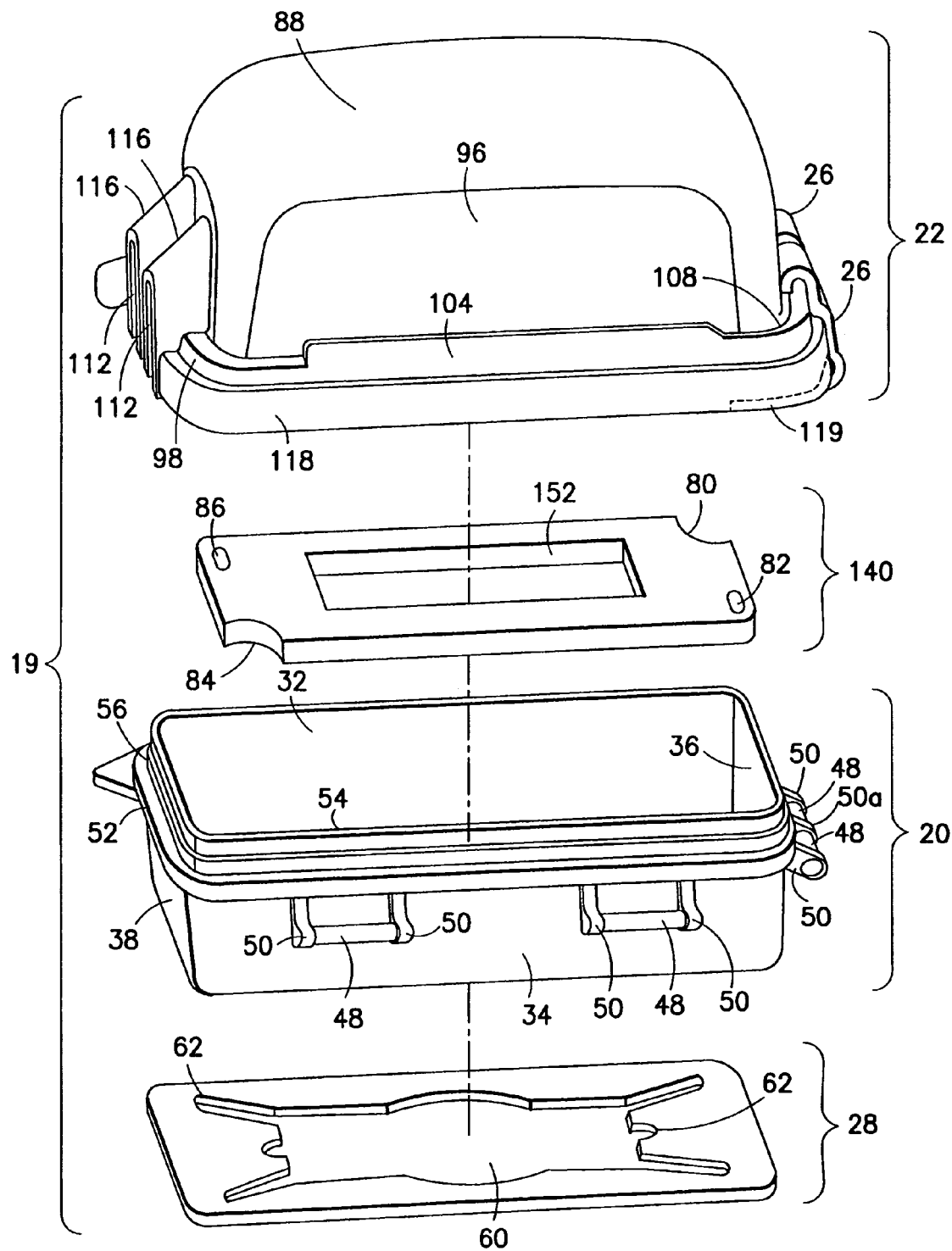
FIG. 1 is an exploded perspective view of an enclosure embodying features of the present invention.
Figure 9:
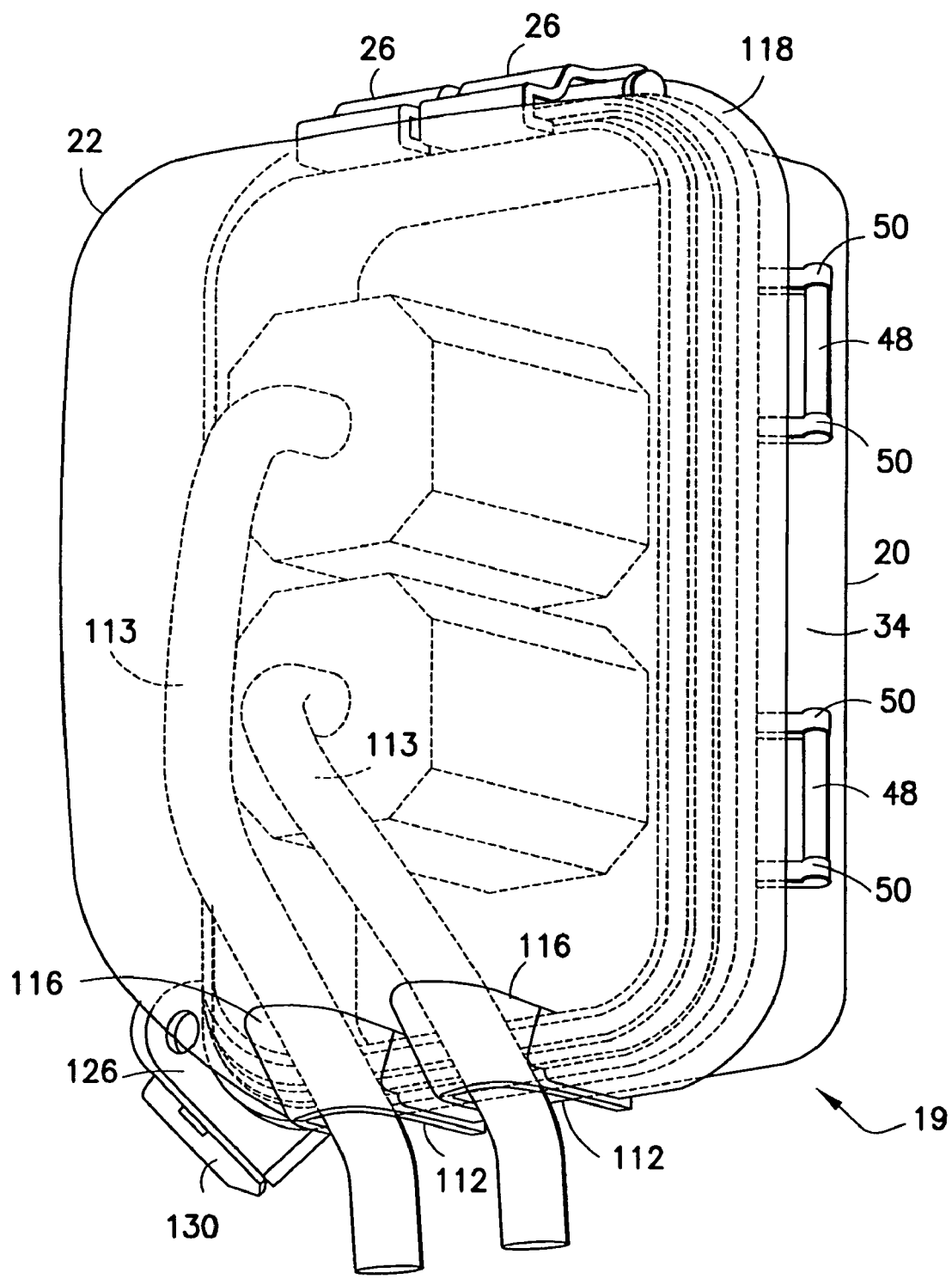
FIG. 9 is a front perspective view of the enclosure of FIG. 1 in use with a duplex type receptacle.

As seen in FIG. 1, an enclosure 19 in accordance with one embodiment of the present invention comprises a base 20, a cover 22, a cover plate 140, hinge clips or clips 26 and a gasket 28. The enclosure is customarily mounted in a vertical or upright position (see, FIG. 9) since electrical fixtures that would be covered by the enclosure are generally oriented vertically with respect to a support structure (e.g., a wall) to which the electrical fixture is attached. Based on the foregoing, the terms top, bottom, side, upper, lower, front, rear, left and right, as used herein with respect to the enclosure are to be understood in the context of the enclosure being in an upright or vertical position as shown in FIG. 9.

The base 20 is mountable on a support structure (not shown) generally presenting a flat surface, for example, the wall surrounding an electrical fixture. See, FIG. 9. The gasket 28 is mounted between the support structure and the base 20 while the cover plate 140 is positioned within the base 20. See, FIG. 1. The cover 22 is pivotably connected to the base 20 by clips 26. In a preferred embodiment, two clips 26 are provided. The clips 26 are slidably movable and can be positioned (see, FIGS. 4A and 4B) to allow the cover to pivot open either vertically (i.e., upwards) or horizontally (i.e., sidewards).

Referring to FIGS. 10A and 10B, the base 20 has a generally box-like configuration. The base is constructed by conventional methods (e.g., molding, machining) using materials suitable for use in an enclosure (e.g., plastic, composites). Preferably, the base is formed as a unitary structure by molding a suitable material (e.g., plastic). The base has a rear wall 30, a top wall 36, a bottom wall 38, a right side wall 32 and a left side wall 34. The top, bottom and side walls extend upwards (i.e., forwards) from the rear wall to define a base opening 39. Preferably, the top bottom and side walls slope outwards to define a base opening 39 larger than the rear wall 30.

The base 20 has a length, width and depth sufficient in size to allow the enclosure to be used with electrical fixtures (and any devices commonly attached to said electrical fixtures such as plugs or electrical cables) that are generally used in the electrical industry. The base 20 also has a length, width and depth sufficient in size to enable the cover 22 to be closed even when devices (e.g., plugs, electrical cables) are connected to the electrical fixture. In the embodiment shown in FIG. 1, the base 20 has a depth of about 27 millimeters. However, it is to be understood that a base having a greater or lesser depth is within the spirit of the present invention. Further, in the embodiment shown in FIG. 1, the base 20 is "dimensioned" (i.e., sized, shaped, constructed and arranged) to allow it to be used with a single gang receptacle.

However, it is to be understood that a base dimensioned for use with a smaller (e.g., a toggle switch) or larger (e.g., a double gang receptacle) sized electrical fixture is within the spirit of the present invention.

As shown in FIG. 10B, the rear wall 30 has a fixture opening 40 located at about the center of the rear wall. The fixture opening 40 has a shape and size sufficient to allow access to electrical fixtures typically used in the electrical industry. Examples of such electrical fixtures are electrical fixtures that are classified as "standard" by the National Electrical Manufacturers Association (NEMA). The rear wall also has a pair cover plate holes 44 that are respectively located at diagonally opposing top and bottom corners of the rear wall. The cover plate holes allow the cover plate 140 to be secured to the rear wall using suitable fasteners (e.g., screws). The cover plate holes may be surrounded by a raised ridge 45 that permits more thread engagement when screws are used as fasteners.

In the embodiment shown in FIG. 10B, the fixture opening 40 has a generally rectangular shape having generally curved recesses 41, 43 respectively located on the right and left side of the fixture opening. However, it is to be understood that a fixture opening having a different shape (e.g., oval) is within the spirit of the present invention. The fixture opening 40 has a notch 46 at the top side and the bottom side. The notches 46 provide access to screws or other fasteners commonly used for attaching an electrical fixture (e.g., a receptacle) to an electrical fixture mounting (e.g., an electrical box). Preferably, the notches 46 are V-shaped. The rear wall 30 also has a mounting hole 42 at each corner. The mounting holes enable the base 20 to be secured to the support structure using suitable fasteners (e.g., screws or nails)

Referring to FIGS. 1 and 10A, in a preferred embodiment, the base 20 has a first pair of hinge assemblies 49 disposed collinear to each other along an outer surface of the left side wall 34. However, the first pair of hinge assemblies may, alternatively, be positioned on an outer surface of the right side base wall 32. A second pair of hinge assemblies 51 is disposed collinear to each other on an outer surface of the top base wall 36. The hinge assemblies 49, 51 are permanently affixed to the base 20. Preferably, the hinge assemblies are molded together with the base to form a unitary structure. The hinge assemblies comprise a hinge pin 48 disposed parallel to an adjacent base wall (i.e., top or side wall as the case may be). Each end of the hinge pin is mounted on an arm 50 that extends perpendicularly from the outer surface of the adjacent base wall.

The hinge assemblies comprising a pair may be laterally spaced apart from each other as shown by the first pair of hinge assemblies 49. Alternatively, the hinge assemblies comprising a pair may be positioned immediately adjacent to each other so that the inboard ends of the two hinge pins 48 are mounted on a common arm 50a as in the case of the second pair of hinge assemblies 51. Further, although the preferred embodiment has two pairs of hinge assembles, it is to be understood that a base having only one hinge assembly or more than two hinge assemblies positioned on the outer surface of the top base wall and/or on the outer surface of one of the side walls of the base is within the spirit of the present invention.

As used herein, the term "hinge-side", when used with respect to the side wall of the base or cover, refers to the side wall of the base or cover on which a hinge assembly is positioned or which is adjacent to a hinge assembly when the cover is in the closed position. The term "non-hinge side", when used with respect to the side wall of the base or cover, refers to the side wall of the base or cover on which a hinge assembly is not positioned or which is not adjacent to a hinge assembly when the cover is in the closed position.

Figure 11:
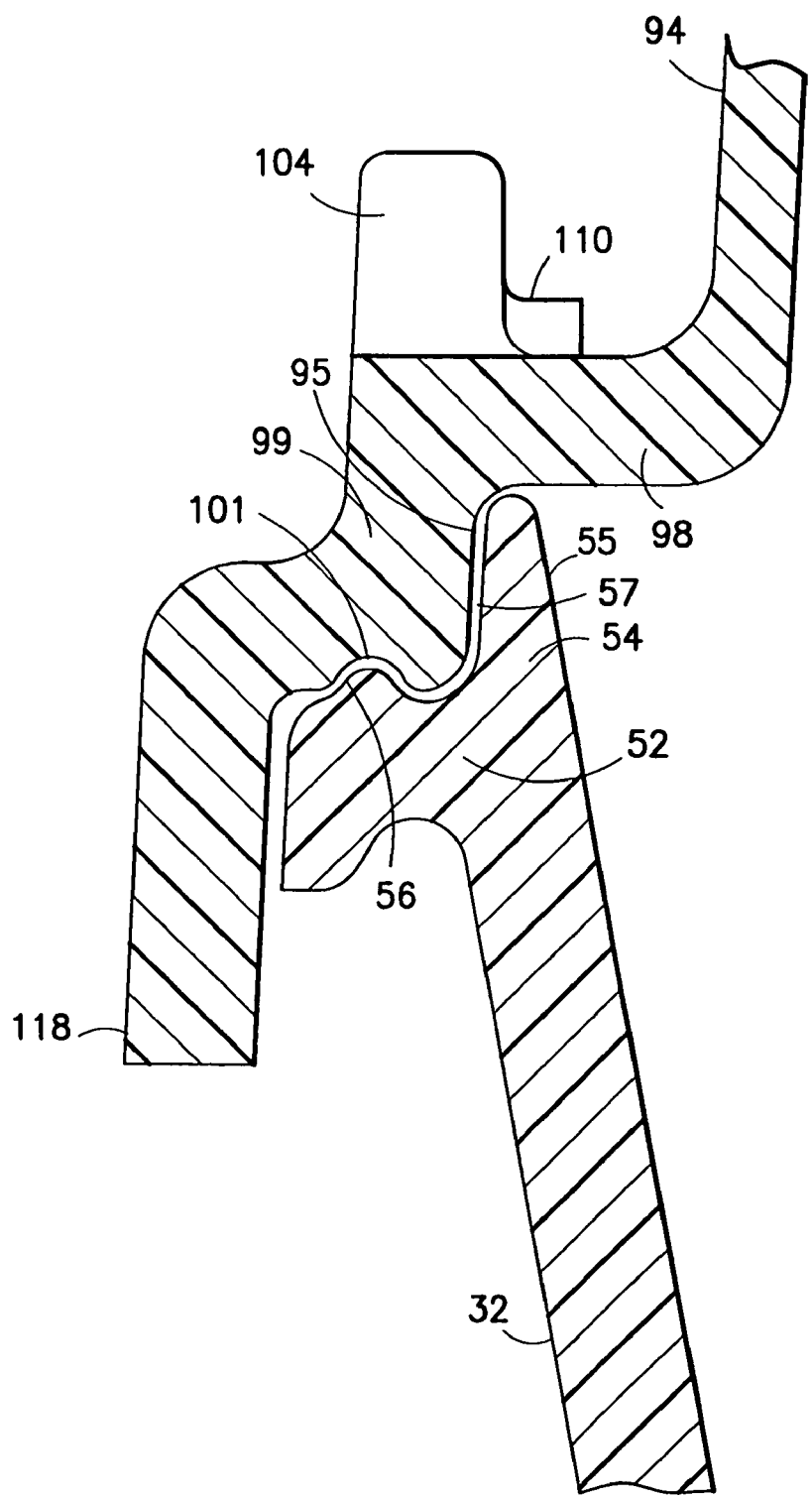
FIG. 11 is an enlarged cross-sectional plan view of a top end of a left side of the enclosure of FIG. 1 with the cover in the closed position.

As shown in FIGS. 10A and 11, the base 20 has a base lip 52 for promoting a waterproof seal in conjunction with the cover. The base lip 52 extends perpendicular to and outwards from forward edges of the top, bottom, and side walls and runs along a periphery of the base opening 39. In a preferred embodiment the base lip 52 has a base flange 54 and a tongue 56 that are both positioned on top of the base lip. The base flange 54 and tongue 56 are disposed perpendicular to an upper surface of the base lip 52 and run along the periphery of the base opening 39. Referring to FIG. 11, the base flange 54 is disposed immediately adjacent to the base opening so that an interior surface 55 of the base flange 54 is co-planar or flush with interior surfaces of the top and side walls of the base. The tongue 56 is disposed outwards at a distance away from the base flange 54. Preferably, the tongue 56 is smaller than the base flange 54. As discussed in more detail below, in a preferred embodiment, the base flange 54 and tongue 56 coact with the cover 22 to form watertight seals when the cover is in the closed position.

Referring to FIG. 12A, the gasket 28 is generally planar and generally has about the same size and shape as the rear wall 30. The gasket has a gasket opening 60 which has about the same size and shape as the fixture opening 40. The gasket opening is positioned on the gasket 28 so as to register with the fixture opening 40 when the base 20 is placed over the gasket 28 when attaching the enclosure to the support structure. A gasket notch 62 is positioned on the top side and bottom side of the gasket opening 60. A mounting notch 62' is also positioned at each corner of the gasket opening. When the base is placed over the gasket, the gasket notches 62 register with base notches 46 and the mounting notches 62' register with mounting holes 42 so as to allow the fasteners used for securing the cover plate and electrical fixture (see, above) to pass through the gasket 28 and rear wall 30. Preferably, the gasket notches 62 and mounting notches 62' are V-shaped.

The gasket is preferably made from a compressible elastomeric material suitable for use in a weatherproof electrical enclosure, e.g., rubber. The material of the gasket allows it to be compressed between the rear wall 30 and the support surface so as to form a weatherproof seal. Preferably, the gasket is affixed to the outer surface of the rear wall 30 with glue or other similar means. This makes it attaching the base and gasket to the support structure and prevents the loss of the gasket during shipping and handling of the enclosure.

Figure 12B:
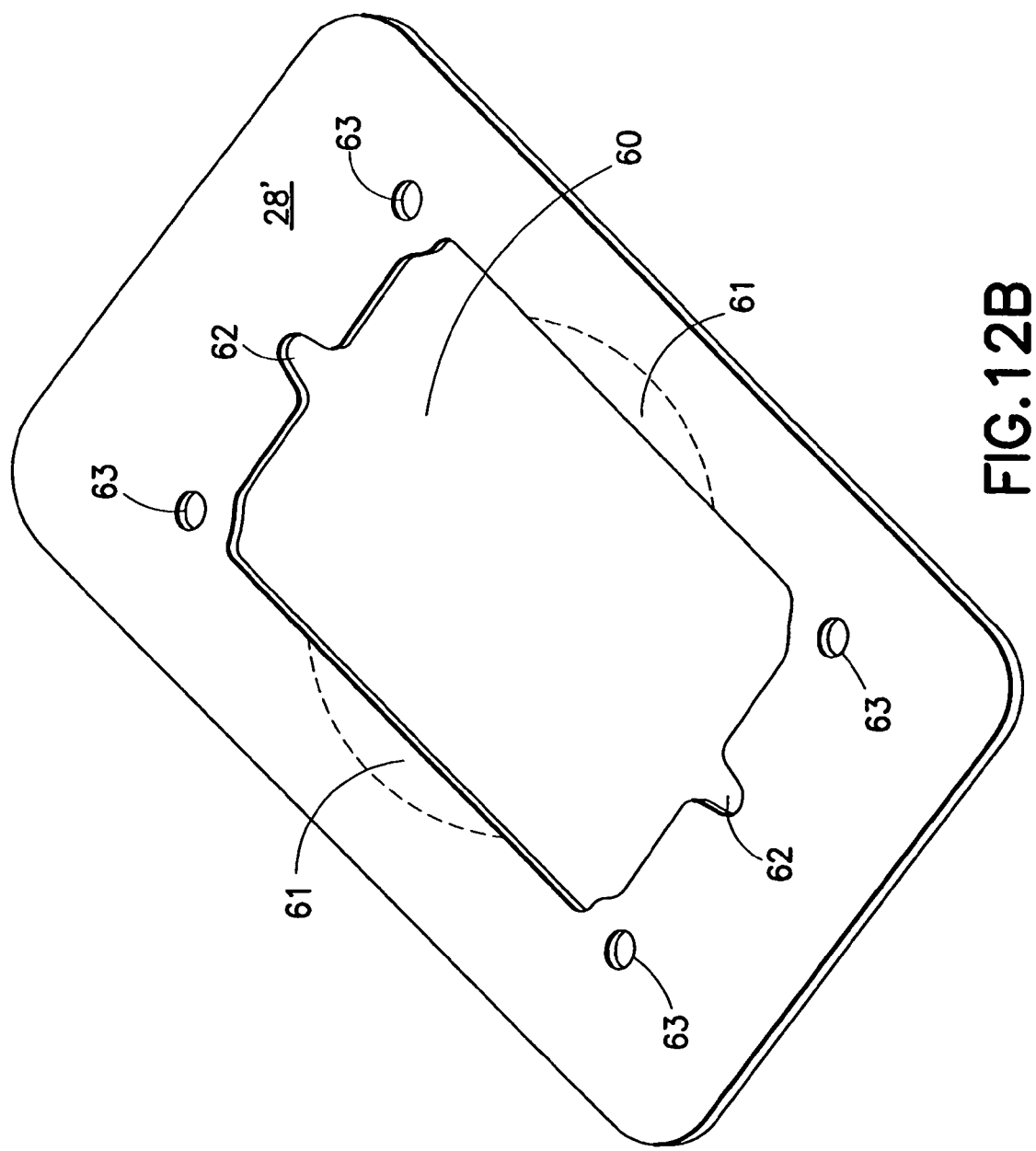
FIG. 12B is a front perspective view of an alternate embodiment of a gasket for use with the enclosure of FIG. 1.

In an alternative embodiment (see, FIG. 12B), the gasket 28' does not have the mounting notches 62' present in the gasket shown in FIG. 12A. Instead, a gasket hole 63 is disposed on the gasket 28' adjacent to each corner of the gasket opening 60. The gasket holes 63 perform the same function as the mounting notches 62' in FIG. 12A. The gasket 28' also has sections 61 (shown in dotted outline) on each side of the gasket opening 60, that can be removed (e.g., by cutting or tearing away) to form curved cutouts that register with recesses 41 and 43 of the rear wall 30. However, except for the foregoing differences, the gasket 28' shown in FIG. 12B is similar to and function in largely the same manner as the gasket 28 previously discussed above with respect to FIG. 12A.

Referring to FIGS. 2A, 2B, 4A, and 4B, the cover has a generally box-like configuration with a front cover wall 88, a top cover wall 90, a bottom cover wall 92, a right side cover wall 94 and a left side cover wall 96. The top, bottom and side cover walls extend upwards (i.e., rearwards) from the front cover wall 88 to define a cover opening 97. See, FIGS. 5A to 5C. Preferably, the top, bottom and side walls slope outwards so that the cover opening 97 is larger than the front cover wall 88. The cover 22 has a length, width and depth sufficient in size to accommodate electrical fixtures generally used in the electrical industry and any devices attached thereto (e.g., plugs or electrical cords) even when the cover is in the closed position. The cover 22 is dimensioned to enable the cover to coact with the base to protect an electrical fixture when the cover is in the closed position and also to allow the cover to be pivotably attached by clips 26 to the top or side of the base 20. The cover may be constructed by conventional methods (e.g., machining or molding) using materials suitable for use in an enclosure (e.g., composites or plastic). Preferably, the cover is molded from clear plastic or other similarly transparent material to allow viewing of an interior of the enclosure even when the cover is in the closed position.

Figure 2A:
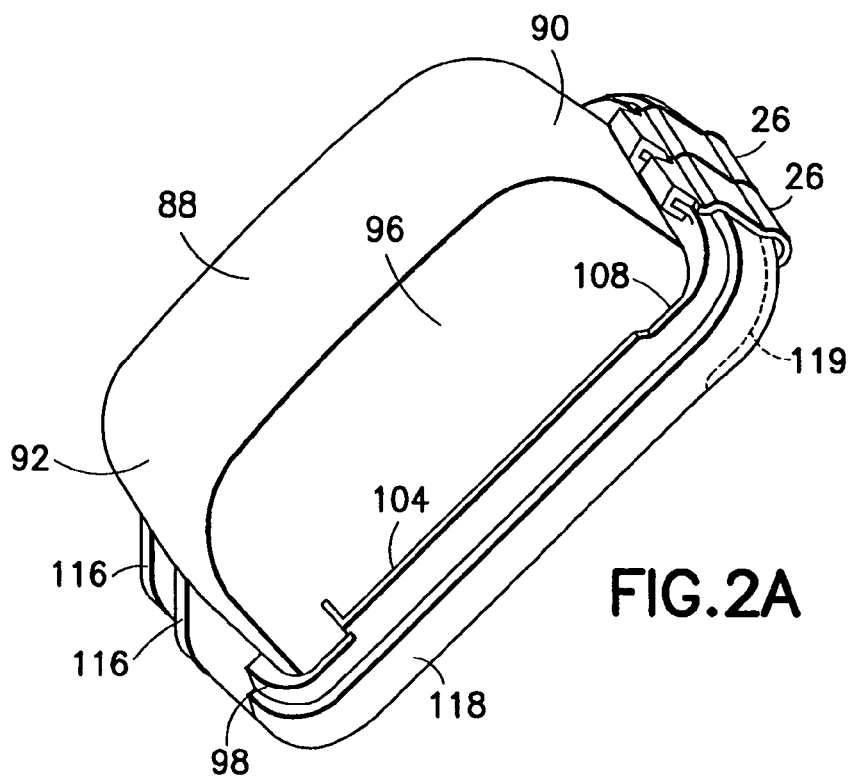
FIG. 2A is a front perspective view of a cover for use with the enclosure of FIG. 1.
Figure 2B:
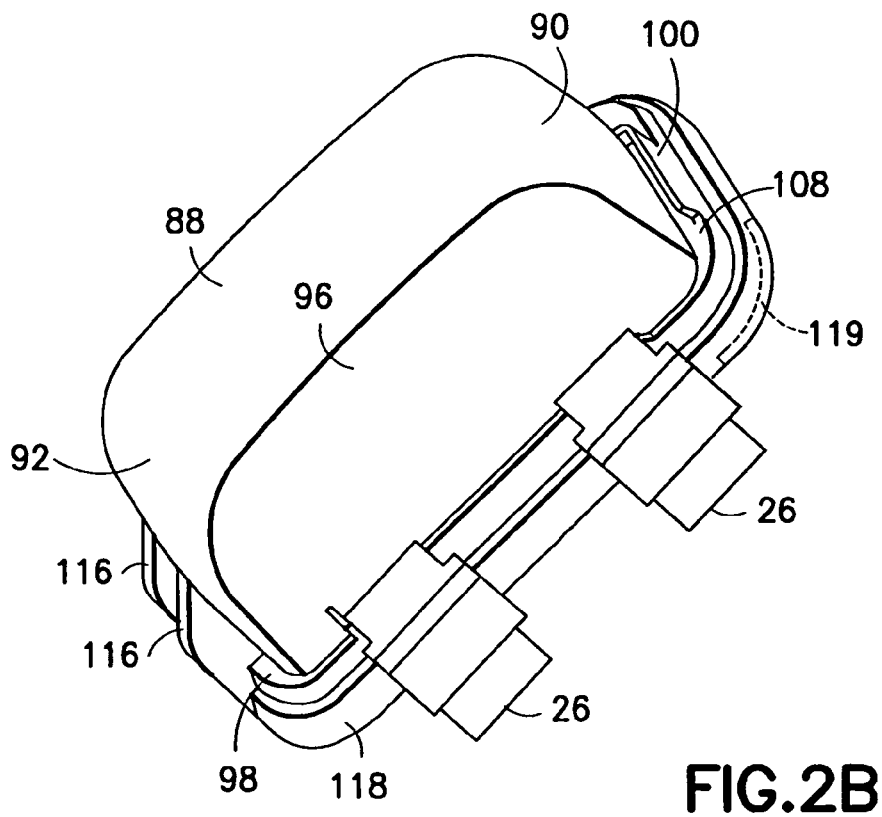
FIG. 2B is a front perspective view of the cover of FIG. 2A with hinge clips moved to a side of the cover.

As shown in FIGS. 2A, 2B and 11, the cover has a cover flange 98 and a cover lip 118. The cover flange 98 is L-shaped and extends perpendicular to and outwards from rear edges of the top bottom and side walls and runs along a periphery of the cover opening 97. A distal end 99 of the cover flange (see, FIG. 11) extends downwards (i.e., rearwards). The cover flange 98 is dimensioned to complement the base lip 52 to form a waterproof seal when the cover is in the closed position. The cover lip 118 adjoins an outer surface of the distal end 99 of the cover flange and runs along a periphery of the cover flange. The cover lip 118 is dimensioned to overlap the base lip 52 when the cover 22 is in the closed position so as to minimize the entry of water or moisture into the enclosure (see, FIG. 11). In a preferred embodiment (see, FIG. 11), a groove 101 is positioned on an edge of the distal end of the cover flange 98 adjacent to a point or border where the cover lip 118 adjoins the cover flange 98 and running parallel to the cover opening. When the cover is in the closed position, the tongue 56 form fits the groove 101 to form a first watertight seal and an outer surface 57 of the base flange lies in surface-to-surface engagement with an inner surface 95 of the distal end 99 of the cover flange 98 to form a second watertight seal.

Referring to FIGS. 2A, 2B, 4A and 4B, a top mounting rail 100 is positioned perpendicular to the front surface of the cover flange 98 and disposed adjacent to and parallel with an outer surface of the top wall 90. A side mounting rail 104 is positioned perpendicular to the front surface of the cover flange 98 and disposed adjacent to and parallel with an outer surface of a hinge-side cover wall, in the present embodiment, the side wall 96. Preferably (see, FIGS. 4A and 4B), mounting rails 100 and 104 each have a rail flange 109 at their "non-corner ends", that is, the ends of mounting rails 100 and 104 that are opposite from the corner where the top cover wall 90 and hinge-side cover wall (i.e., side wall 96) meet to form a corner. Each rail flange 109 extends perpendicularly from the respective non-corner end of the top and bottom mounting rails to the outer surface of an adjacent cover wall (i.e., the top or hinge-side cover wall as the case may be). The rail flange 109 provides support to mounting rails 100 and 104 and prevents the hinge clips 26 from inadvertently slipping off the mounting rails.

The top mounting rail 100 is separated from the side mounting rail 104 by an elongated cutout or upper notch 108 (see, FIGS. 2A and 2B) disposed adjacent to and running parallel with the corner where the top cover wall 90 and the hinge-side cover wall meet to form a corner (see above). An inner surface of the cover lip 118 has a recessed section or lower notch 119 running parallel to the upper notch 108. See, FIGS. 2A, 2B, 5A to 5C. The lower notch 119 is shown in dotted outline in FIGS. 2A and 2B. The upper notch 108 and lower notch 119 coact with each other to provide an entry point for attaching clips 26 to the cover and also provide room for clips to slide around the corner of the cover as clips are moved from one position to another (see below).

Referring to FIGS. 5A to 5C, the cover has one or more cable openings 112 to allow the connection of a cable to the electrical fixture protected by the enclosure. Preferably, the cable opening is covered by a removable cable cap 114. As shown in FIG. 9, the cable opening 112 is dimensioned to allow cables 113 of the type generally used in the industry to pass through the cover 22 (shown in phantom outline) in the closed position. The cable opening 112 is also dimensioned to hold the cable in place without excessive pressure or stress being applied to the cable. See, FIGS. 5A to 5C. In a preferred embodiment, the cover has a first pair of spaced-apart cable openings 112 positioned on a non-hinge side cover wall (in the present embodiment, side cover wall 94) and a second pair of spaced-apart cable openings 112 positioned in the bottom cover wall 92. Preferably, the cable openings 112 are U-shaped notches extending from the cover lip 118 and into an adjacent wall of the cover. The cable openings may be shielded or protected by elongated U-shaped hoods 116 (see, FIGS. 4A, 4B and FIG. 9) that extend from an outer surface of the adjacent wall of the cover.

Figure 3A:
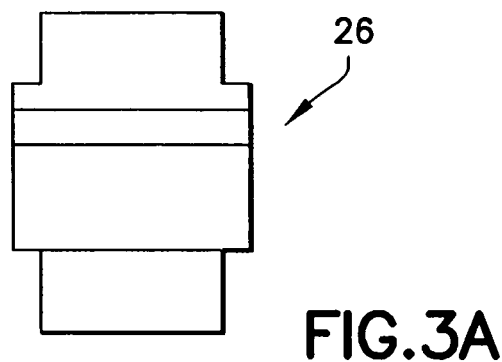
FIG. 3A is a front plan view of a hinge clip for use with the enclosure of FIG. 1.
Figure 3B:
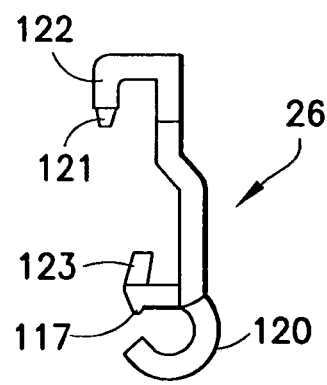
FIG. 3B is a side plan view of the hinge clip of FIG. 3A.
Figure 3C:
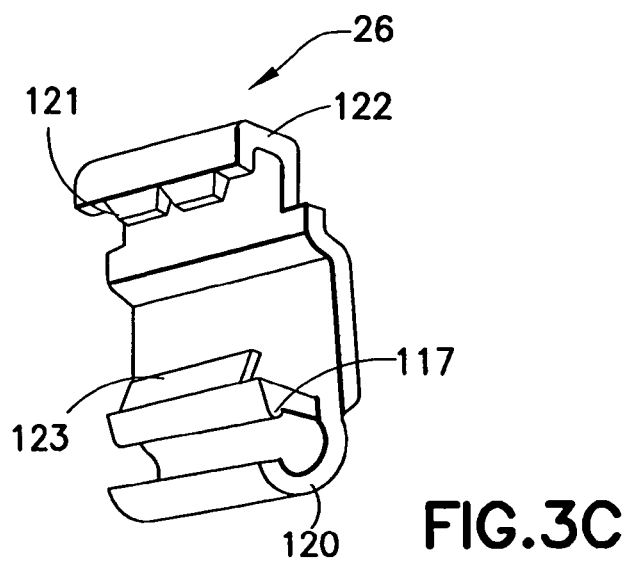
FIG. 3C is a rear perspective view of the hinge clip of FIG. 3A.
Figure 6:
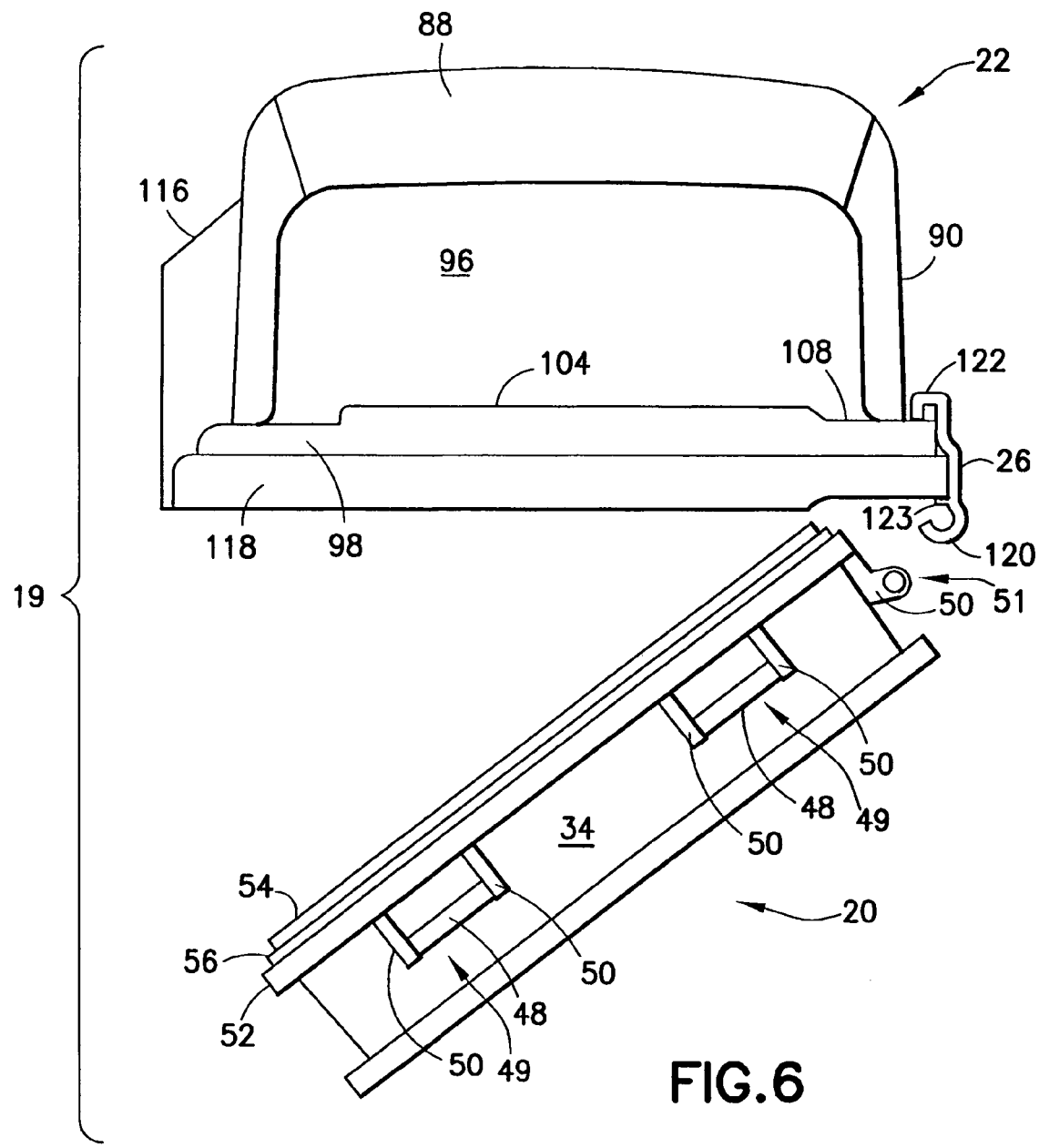
FIG. 6 is a side plan view of the enclosure of FIG. 1.

As shown in FIGS. 3A to 3C, the hinge clip 26 has a generally rectangular shaped structure. The hinge clip may be constructed using conventional methods (e.g., molding, or machining) using materials suitable for use in an enclosure (e.g., plastic or composites). The top end of the clip 26 has a generally U-shaped, inwards facing rail hook 122 for slidably engaging the top or side hinge mounting rails 100, 104. See, FIGS. 2A and 2B. Preferably, the rail hook 122 has a notched ridge 121 at a distal edge thereof. The notch ridge 121 is dimensioned to snap fit over protrusions or stops 110 (see, FIGS. 4A and 4B) on the cover. The stops are positioned along an inner surface of the mounting rails 100, 104 at locations that would be adjacent to a hinge pin 48 (see, FIG. 6) when the cover 22 is in the closed position. The stop 110 and notched ridge 121 coact to keeps the clip 26 in place. Also, (see FIG. 3B) the top portion of the hinge clip that is adjacent to the rail hook 122 is curved slightly inwards.

At a bottom end of the clip 26 is a generally semi-circular pin hook 120 that is disposed facing the rail hook. The pin hook connects or engages the clip 26 to the hinge pin 48. The clip 26 also has a generally U-shaped lip hook 123 positioned at a distance away from and facing the rail hook 122. The lip hook engages the cover lip 118 (see, FIG. 6) to help keep the clip in place on the cover. The lip hook also has a small ridge 117 (see, FIGS. 3B and 3C) running along an outside surface of the lip hook 123 adjacent to and running parallel with a distal end of the pin hook 120. The small ridge 117 coacts with the pin hook to allow the pin hook to snap fit onto the hinge pin 48. The manner of attaching the clip 26 to the base 20 and cover 22 is discussed below.

An additional feature of the invention is a latch mechanism (see, FIGS. 7A and 7B) to help keep the cover 22 in the closed position. The latch mechanism comprises a base tab 124 extending outwards from an outer surface of the base adjacent to the base opening. Preferably, the base tab 124 is positioned on a bottom corner of the base that is not adjacent to any hinge mounting. The latch mechanism further comprises a hook assembly for engaging the base tab 124. The hook assembly comprises an L-shaped latch flange 126 extending outwards from an outer surface of the cover adjacent to the cover opening, preferably an outer surface of the cover lip 118. A distal end of the latch flange extends rearwards and has a catch 128 on an inner surface thereof. The latch flange 126 extends outwards from the cover at a distance sufficient to allow the distal end of the latch flange to engage the base tab 124 when the cover is in the closed position. As the cover 22 is moved to the closed position, the catch 128 engages the base tab 124. Force applied to the cover 22 causes the catch 128 to snap fit over the base tab 124 to latch the cover in the closed position. A latch handle 130 extends outward from the distal end of the latch flange 126 to assist in opening and closing the cover 22. The catch mechanism is released by pulling the handle 130 in the direction of the pivoting movement of the cover 22.

The latch mechanism has also has a locking assembly to prevent access to the electrical fixture. The locking assembly comprises an upper padlock hole 132 in the latch flange 126 and a lower padlock hole 134 in the base tab 124. The padlock holes 132, 134 register with each other when the cover is in the closed position. A suitable lock device (not shown) such as a padlock may be placed through padlock holes 132, 134 to lock the cover 22 in the closed position.

Figure 8A:
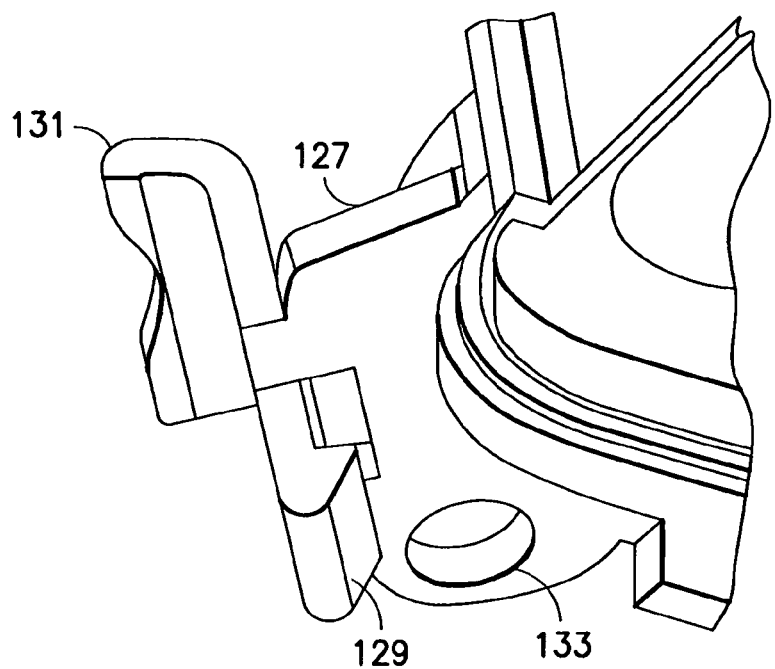
FIG. 8A is a rear perspective view of a hook assembly for use with an enclosure embodying features of the present invention.
Figure 8B:
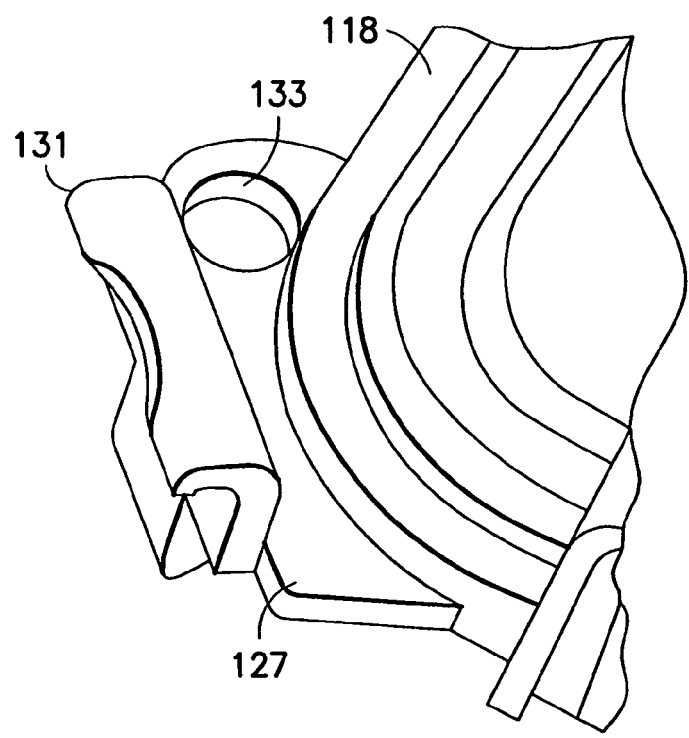
FIG. 8B is a front perspective view of the hook assembly of FIG. 8A.

FIGS. 8A and 8B show an alternate hook assembly for use with base tab 124 of FIGS. 7A and 7B. The alternate hook assembly comprises a latch flange 127 extending outwards from the outer surface of the cover adjacent to the cover opening, preferably an outer surface of the cover lip 118. A generally rectangular shaped locking clip 131 is pivotably mounted along a distal end of the latch flange 127 perpendicular to the latch flange. The locking clip is preferably mounted to the distal end of the latch flange at about the midpoint of the locking clip. The top end of the locking clip is curved to form a handle portion and the bottom end of the locking clip has a catch 129 on an inner surface thereof. The latch flange 127 extends from the cover at a distance sufficient to allow the locking clip to engage the base tab 124 when the cover is in the closed position. Force applied to the cover 22 causes the catch 129 to snap fit over the base tab 124 to latch the cover in the closed position. The catch mechanism is released by pulling the handle portion of the locking clip 129 in the direction of the pivoting movement of the cover 22. As in latch flange 126 in FIGS. 7A and 7B, the latch flange 127 shown in FIGS. 8A and 8B has an upper padlock hole 133 that registers with the lower padlock hole 134 in the base tab 124.

According to another feature of the present invention (see, FIG. 1) there is provided a cover plate 140 mountable on an inner surface of rear wall of the base 20 so as to prevent inadvertent access to the electrically conductive parts of electrical fixtures and to conceal the wiring thereof. The cover plate is made of a material suitable for use with an electrical fixture (e.g., plastic, composites) and fabricated by conventional methods (e.g., molding, machining). The cover plate 140 (see, FIG. 13) is generally planar substrate and has a set of removable ribs. The location and arrangement of these removable ribs are shown as dashed outlines. The cover plate is generally rectangular shaped. However, it is to be understood that a cover plate having other shapes (e.g. oval or square shaped) is within the spirit of the present invention. As discussed in more detail below, by removing a particular rib or combination of ribs, different types of openings can created to allow the cover plate to be used with different kinds of electrical fixtures. The removable ribs may be created by partially cutting them out of the cover plate, pre-scoring the cover plate or by other conventional methods generally used in the industry for making removable parts.

Figure 13:
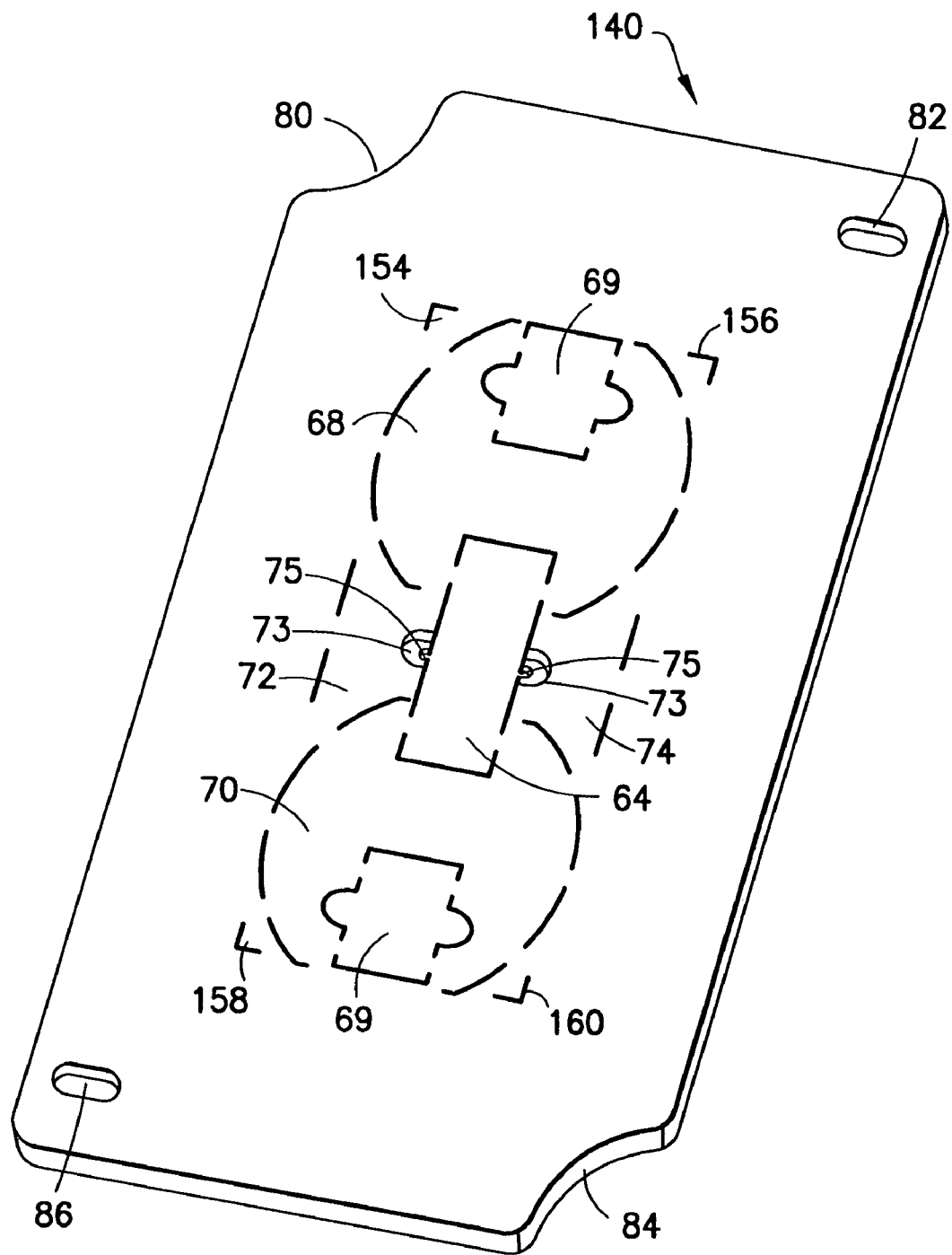
FIG. 13 is a front perspective view of a cover plate for use with the enclosure of FIG. 1.

Referring to FIG. 13, the set of removable ribs comprises a center rib 64, a pair of side ribs 72 and 74, a pair of aperture ribs 68 and 70, a pair of insert ribs 69, and corner ribs 154, 156, 158 and 160. The center rib 64 is generally rectangular shaped and is disposed at about the center of the cover plate. Side ribs 72 and 74 are generally trapezoidal-shaped. Side rib 72 is disposed adjacent to one side of the center rib 64 and side rib 74 disposed adjacent to the opposite side of the center rib 64.

Figure 15A:
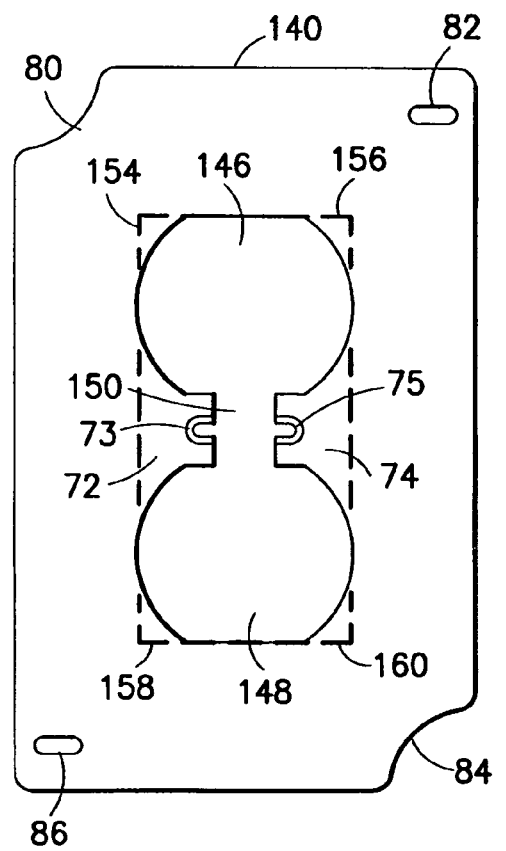
FIG. 15A is a front plan view of the cover plate of FIG. 13 with aperture ribs, insert ribs and center rib removed.

The sides of the side ribs 72, 74 that are adjacent to the center rib are dimensioned to enable the insert rib 69 to snap fit into an insert space 150 (see, FIGS. 15A and 15E) that is created between side ribs 72 and 74 when the center rib 64 and aperture ribs 68, 70 are removed (see below). Preferably, side ribs 72 and 74 each have a slot 73 that is located on the side of side ribs 72, 74 adjacent to about the midpoint of center rib 64. The slot 73 is disposed perpendicular to the center rib. The slot 73 is dimensioned to enable an ear 162 of the insert rib 69 to snap fit into the slots (see below) when the insert rib is placed into the insert space. See, FIGS. 15A and 15E. In a preferred embodiment, each slot 73 has a step or recess 75 on the front edge of the slot.

Figure 15B:
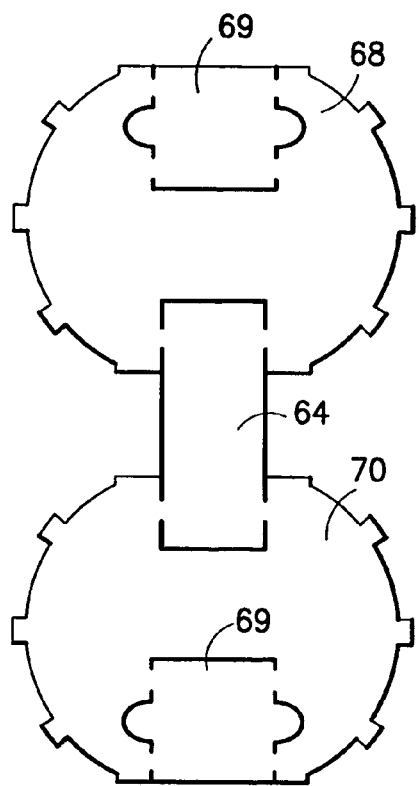
FIG. 15B is a front plan view of aperture ribs, insert ribs and center rib removed from the cover plate of FIG. 13.

The first aperture rib 68 and second aperture rib 70 are generally circular shaped and have a flat top portion and a flat bottom portion. See, FIGS. 13 and 15B. The first and second aperture rib are disposed respectively above and below the center rib 64 (see, FIG. 13) in such a manner so that a portion of the top end of the center rib 64 extends into the bottom end of the first aperture rib 68 and a portion of the bottom end of the center rib extends into the top end of the second aperture rib 70. Further, the first aperture rib 68 has an insert rib 69 disposed in the top portion thereof so that the top edge of the insert rib form part of the top of the first aperture rib while the second aperture rib 70 has an insert rib 68 disposed in the bottom portion thereof so that the bottom edge of the insert rib forms part of the bottom of the second aperture rib.

Figure 15C:
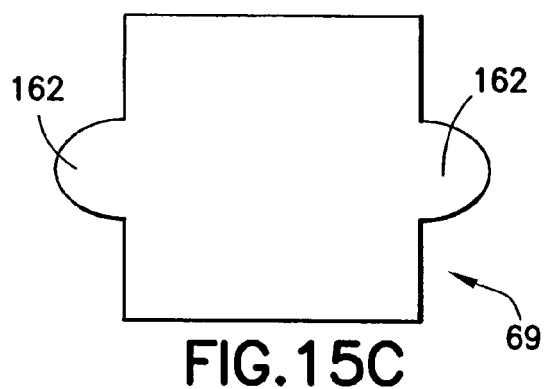
FIG. 15C is a front plan view of the insert rib of FIG. 15B.
Figure 15D:
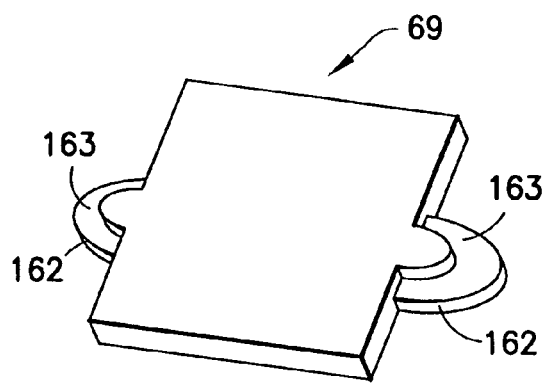
FIG. 15D is a rear perspective view of the insert rib of FIG. 15C.
Figure 15E:
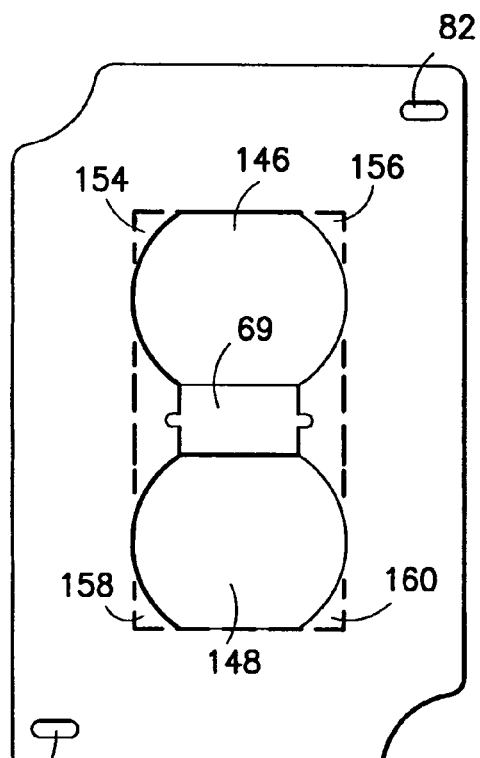
FIG. 15E is a front plan view of the cover plate of FIG. 15A with the insert rib of FIG. 15C fitted into an insert space.

Referring to FIGS. 15C to 15E, the insert rib 69 is generally square-shaped and dimensioned to allow the insert rib to snap fit into the insert space 150. Preferably, the insert rib has ears 162 on each side that are dimensioned to allow the insert rib to snap fit into the slots 73 of side ribs 72 and 74. In a preferred embodiment, the ears have a step or recess 163 along the rear surface of the edges of the ear. When the cover plate is assembled for use with a duplex receptacle (see below) or such other similarly shaped electrical fixture, the insert rib is removed from either aperture rib 68, 70 to fill in the insert space 150. The insert rib is positioned over the front of the cover plate so that the ears 162 and recesses 163 of the insert rib snap fit into the slots 73 and recesses 75 of side ribs 72, 74 and so that the front surface of the insert rib is co-planar with or lies flush (see, FIG. 15E) with the front surface of the cover plate 140.

In an alternate embodiment, the recesses of ribs 72, 74 are located on the rear surface of the ribs rather than the front surface. Also, in said alternate embodiment the insert rib 69' has ears 162' on each side wherein the ears have a step or recess 164 along the front surface of the edges of the ears 162'. Instead of being positioned over the front of the cover plate as in the case of insert rib 69, insert rib 69' is positioned over the rear surface of the cover plate so that the ears 162' and recesses 164 of the insert rib 69' snap fit into the slots and recesses of the side ribs 72, 74 so that the front surface of the insert rib 69' lies flush (see, FIG. 15E) with the front surface of the cover plate 140. The insert rib 69' may have legs 166 that serve as a support for insert 69' when the cover plate is positioned over the electrical fixture. That is, legs 166 contact the outer surface of the electrical fixture and help keep the insert rib 69' in place.

Figure 17A:
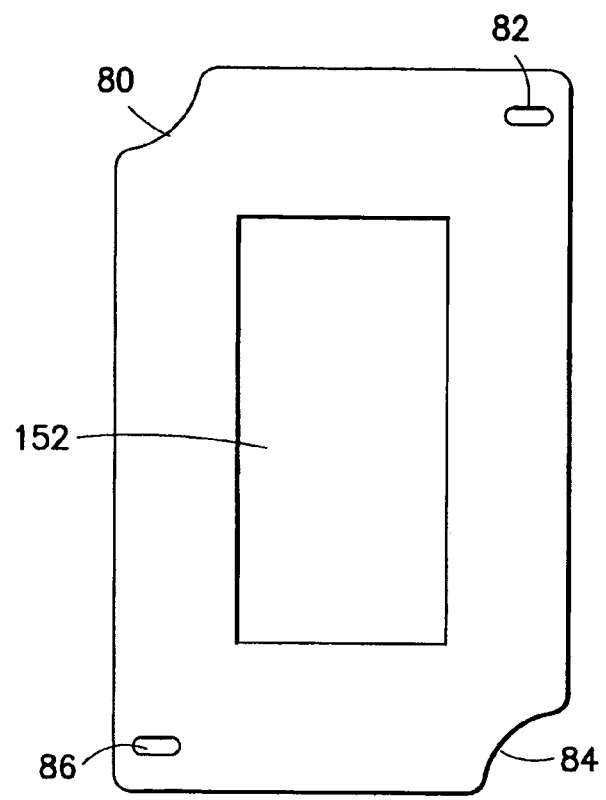
FIG. 17A is a front plan view of the cover plate of FIG. 13 with the center rib, aperture ribs, insert ribs, side ribs, and corner ribs removed.
Figure 17B:
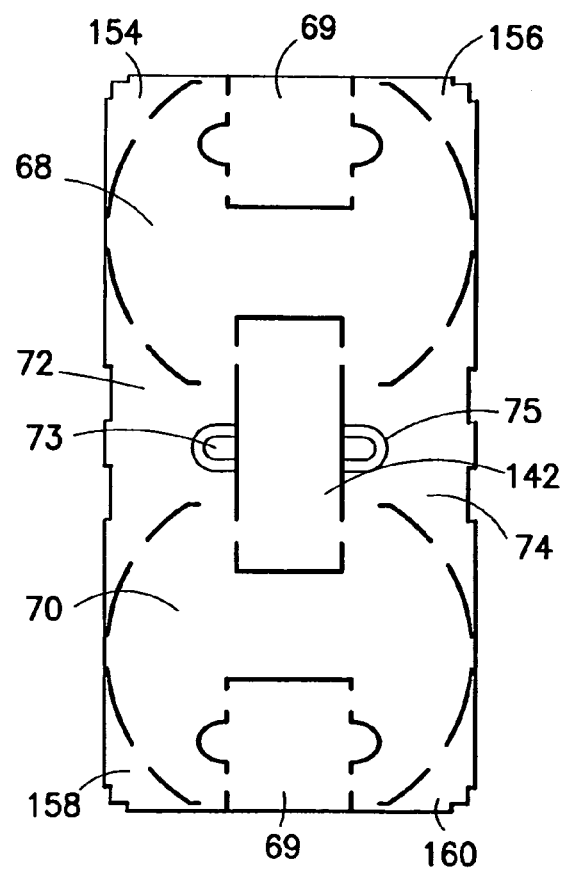
FIG. 17B is a front plan view of the center rib, aperture ribs, insert ribs, side ribs, and corner ribs removed from the cover plate of FIG. 13.
Figure 18A:
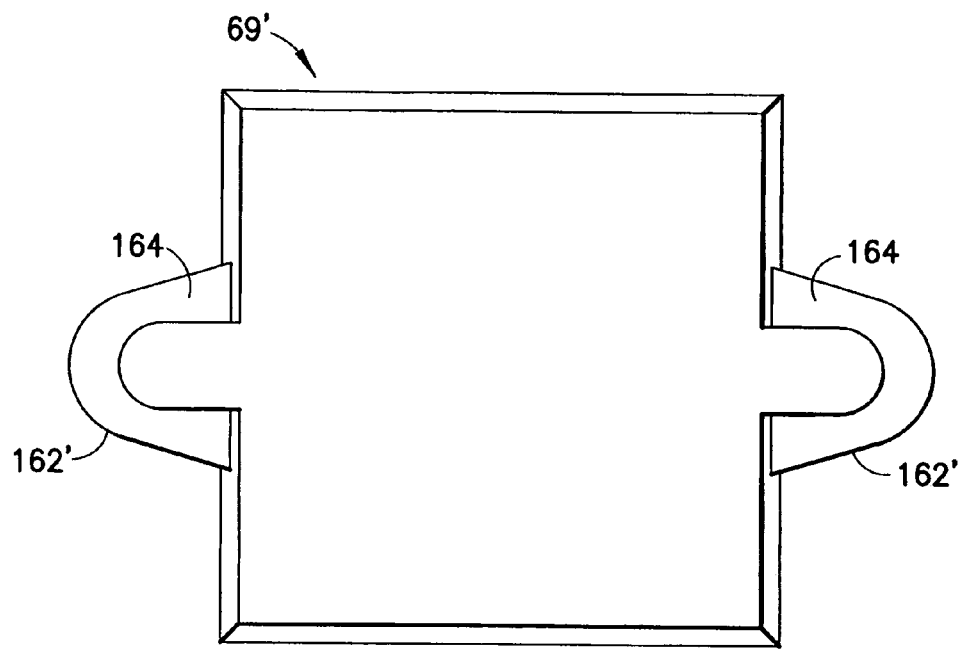
FIG. 18A is a front plan view of another embodiment of an insert rib for use with the cover plate of FIG. 13.
Figure 18B:
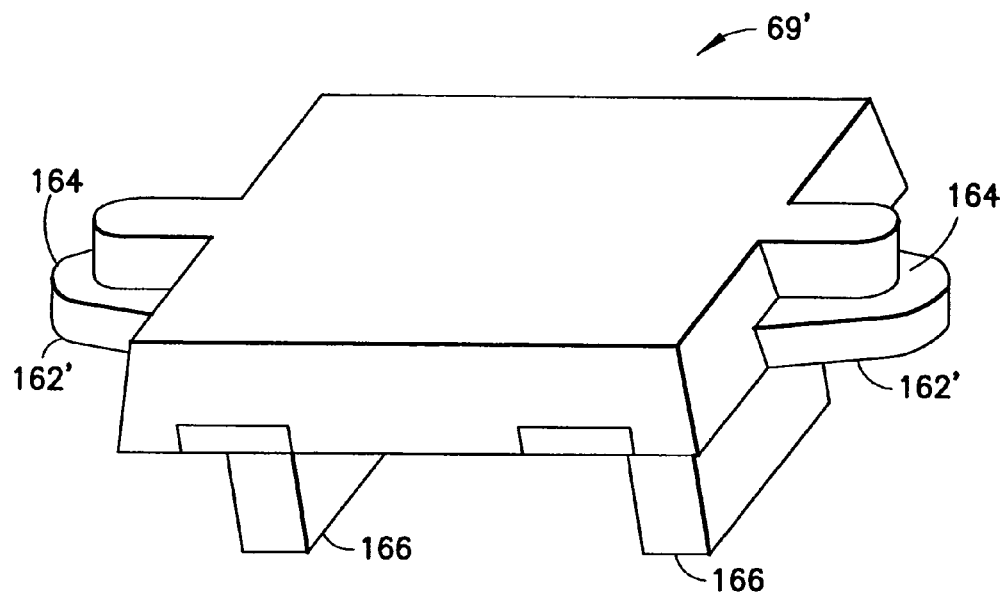
FIG. 18B is a front perspective view of the insert rib of FIG. 18A.

The corner ribs 154, 156, 158 and 160 are generally triangular-shaped. See, FIGS. 13 and 17B. Corner ribs 154 and 156 are respectively positioned adjacent to opposite ends of the top of the first aperture rib 68 and corner ribs 158 and 150 are respectively positioned adjacent to opposite ends of the bottom of the second aperture rib 70.

Figure 16A:
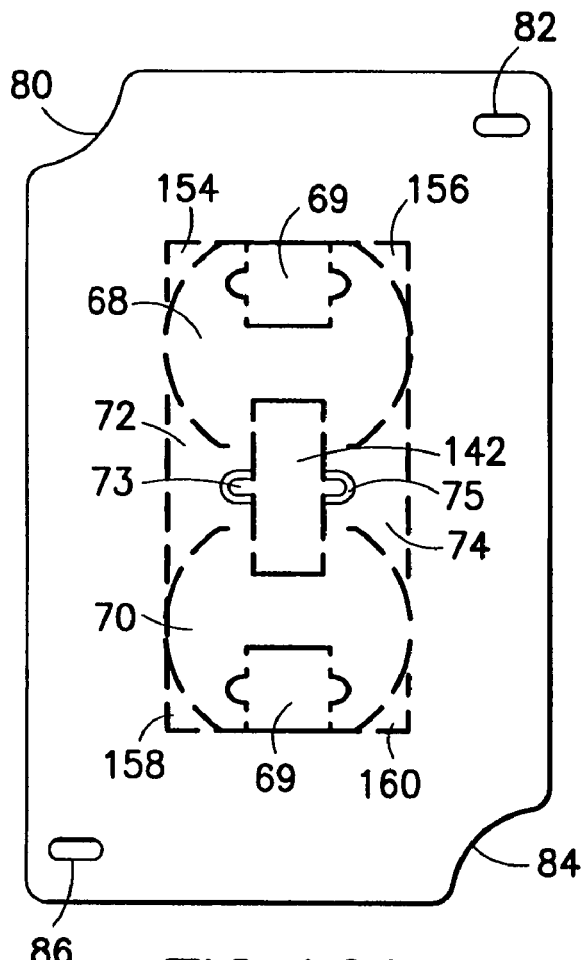
FIG. 16A is a front plan view of the cover plate of FIG. 13 with the center rib removed.
Figure 16B:
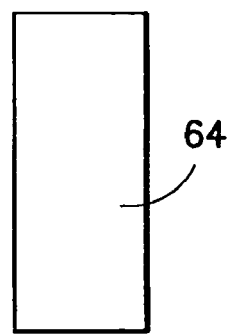
FIG. 16B is a front plan view of the center rib removed from the cover plate of FIG. 16A.

Referring to FIGS. 13 and 15A to 15E, the cover plate 140 is configured use with a duplex type receptacle as follows. First, the center rib 64, aperture ribs 68, 70 and insert ribs 69 are removed (see, FIG. 15B). This creates two generally circular shaped openings 146, 148 that are joined together by the insert space 150. See, FIG. 15A. The insert rib 69 is then inserted into the insert space so that the front surface of the insert rib is coplanar or flush with the front surface of the cover plate. See, FIGS. 15B and 15E. To configure the cover plate 140 for use with an electrical fixture requiring a toggle-type switch opening, the center rib 64 is removed (see, FIG. 16B) so as to create a first rectangular opening 142 (see, FIG. 16A) suitable for use with a toggle switch or other similar device. To configure the cover plate 140 for use with an electrical fixture requiring a large, rectangular opening (e.g., a GFCI receptacle or a Decora type switch), the center rib 64, aperture ribs 68, 70, insert ribs 69, side ribs 72, 74 and corner ribs 154, 156, 158 and 160 are removed (see, FIG. 17B). This creates a second rectangular opening 152 (see, FIG. 17A) larger than the first rectangular opening 142. The foregoing aspect of the present invention (i.e., the use of removable ribs) is advantageous because it enables the enclosure to be used with different kinds of electrical fixtures. As such, it obviates the need to include different kinds of cover plates when marketing or selling the enclosure, thereby reducing costs.

In a preferred embodiment of the present invention (see, FIG. 13), the cover plate has an upper concave shaped recess or arcuate cut-out section 80 disposed on one top corner, a first horizontally elongated mounting hole 82 disposed on an opposite top corner, a lower concave shaped recess or arcuate cut-out section 84 disposed on a bottom corner diagonally opposite from the upper corner where the upper recess 80 is disposed and a second horizontally elongated mounting hole 86 disposed on an opposite bottom corner. The mounting holes 82, 86 are disposed to register with the cover plate holes 44 when the cover plate is positioned over the rear wall 30 (see, FIG. 1) of the base 20 and enable the cover plate to be mounted to the rear wall of the base using fasteners (e.g., screws). The recesses 80, 84 and elongated mounting holes 82, 86 make it easier to position or remove the cover plate from the rear wall 30 when mounting or removing the enclosure from a support structure.

Figure 14:
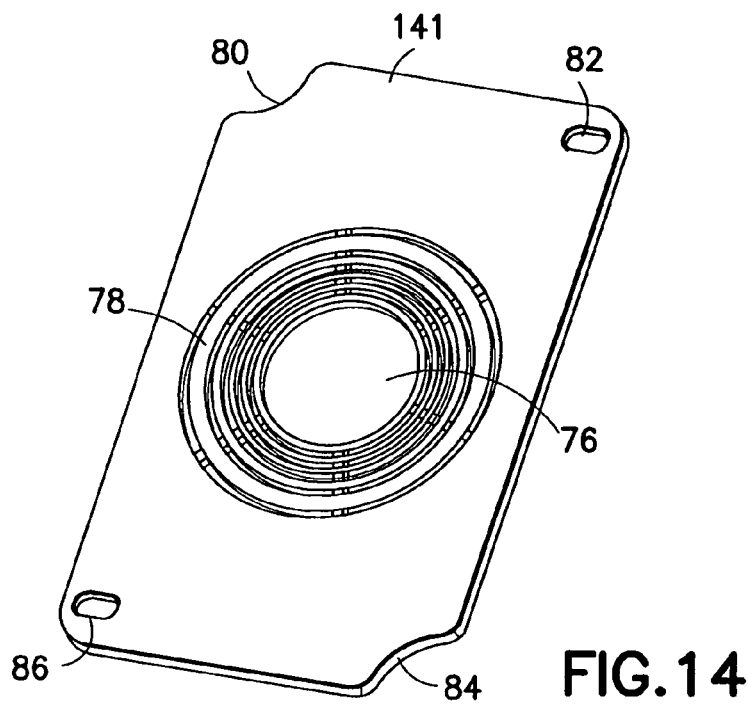
FIG. 14 is a front perspective view of an alternative embodiment of a cover plate for use with the enclosure of FIG. 1.

In another alternative embodiment (see, FIG. 14), the cover plate 141 is generally planar and has a circular opening 76 disposed at about the center of the cover plate. The circular opening is surrounded by a set of removable concentric ribs 78. The size of the opening 76 can be increased by removing one or more concentric ribs. The cover plate 141 may also have recesses 80, 84 and elongated mounting holes 82, 86.

The enclosure is installed for use with an electrical fixture in the following manner. See, FIGS. 1 and 9. The gasket 28 is placed over the support surface (not shown) so that the electrical fixture can be accessed through the gasket opening 60. The base 20 is then placed over gasket 28 so that the fixture opening 40 registers with the gasket opening 60 and the mounting holes 42 register with the gasket notches 62'. The base 20 is then attached to the support surface with suitable fasteners through the mounting holes 42. The appropriate ribs are removed from the cover plate 140 to create an opening suitable for use with the electrical fixture. The cover plate 140 is then placed into the base 20 and secured in place over with appropriate fasteners through the mounting holes 82, 86 and cover plate holes 44 . . . If an electrical cable is to be attached to the fixture (see, FIG. 9), the cable caps 114 are removed from the appropriate cable opening 112 (see, FIGS. 5C, 5B).

The cover is attached to the base as follows. See FIGS. 2A, 2B, 4A and 4B. If it is desired that the cover pivots open upwards, the clips 26 are attached to the top mounting rail 100 by slipping the rail hooks 122 of the clips over the top mounting rail 100 via the upper notch 108 while at the same time slipping the lip hooks 123 over the cover lip 118 via the lower notch 119. The clips are then slid sideways to snap fit into the appropriate hinge stops 110. If it is desired that the cover opens sideways, the clips are attached to the side mounting rail 104 by slipping the rail hooks 122 over the side mounting rail 104 via the upper notch 108 while at the same time slipping the lip hooks 123 over the cover lip 118 via the lower notch 119. The clips are then slid downwards to snap fit into the appropriate hinge stops 110. After the clips 26 are attached to the cover, the cover 22 is attached to the base by hooking the pin hooks 122 over the corresponding hinge pin 48 on the base 20. See, FIG. 6.

Figure 4B:
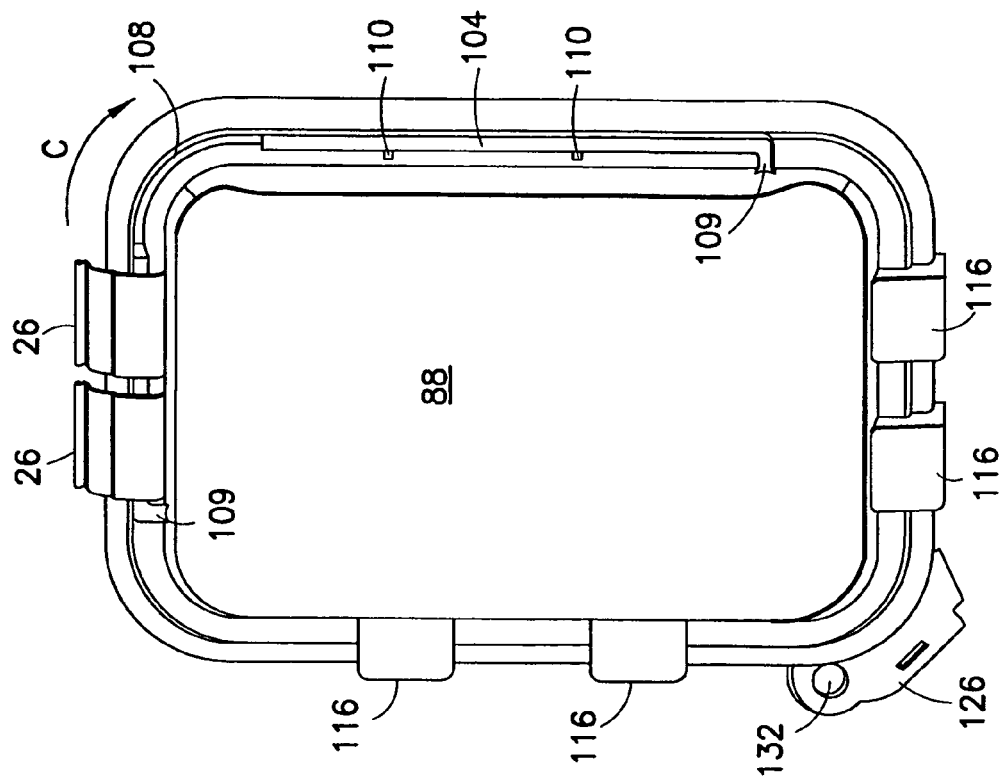
FIG. 4B is a top plan view of the cover of FIG. 2A.
Figure 4A:
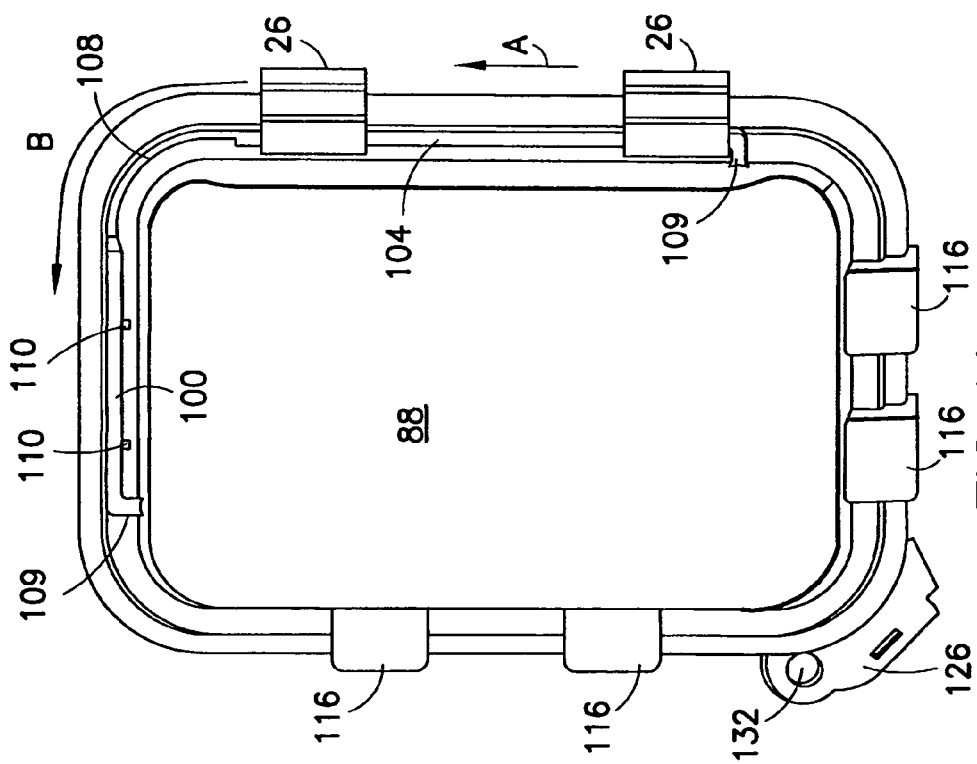
FIG. 4A is a top plan view of the cover of FIG. 2B.

To change the orientation of the cover, the cover is detached from the base by unhooking the clips 26 from the hinge pins 48, and changing the positioning of the clips as follows. Referring to FIG. 4A, if the clips 26 are positioned on the side mounting rail 104, the clips are slid off the side mounting rail 104 and cover lip 118 in the direction shown by arrow A. The clips are slid around the corner of the cover via the upper notch 108 and lower notch 119, slipped over the top mounting rail 100 and cover lip 119 in the direction shown by arrow B and then, finally, snap fitted into the appropriate stops 110. Referring to FIG. 4B, if the clips 26 are positioned on the top mounting rail 100, the clips are slid off the top mounting rail 100 and cover lip 118 in the direction shown by arrow C. The clips are then slid around the corner of the cover via the upper notch 108 and lower notch 119, slipped over the side mounting rail 104 and cover lip 119 and then, finally, snap fitted into the appropriate stops 110.

Figure 19:
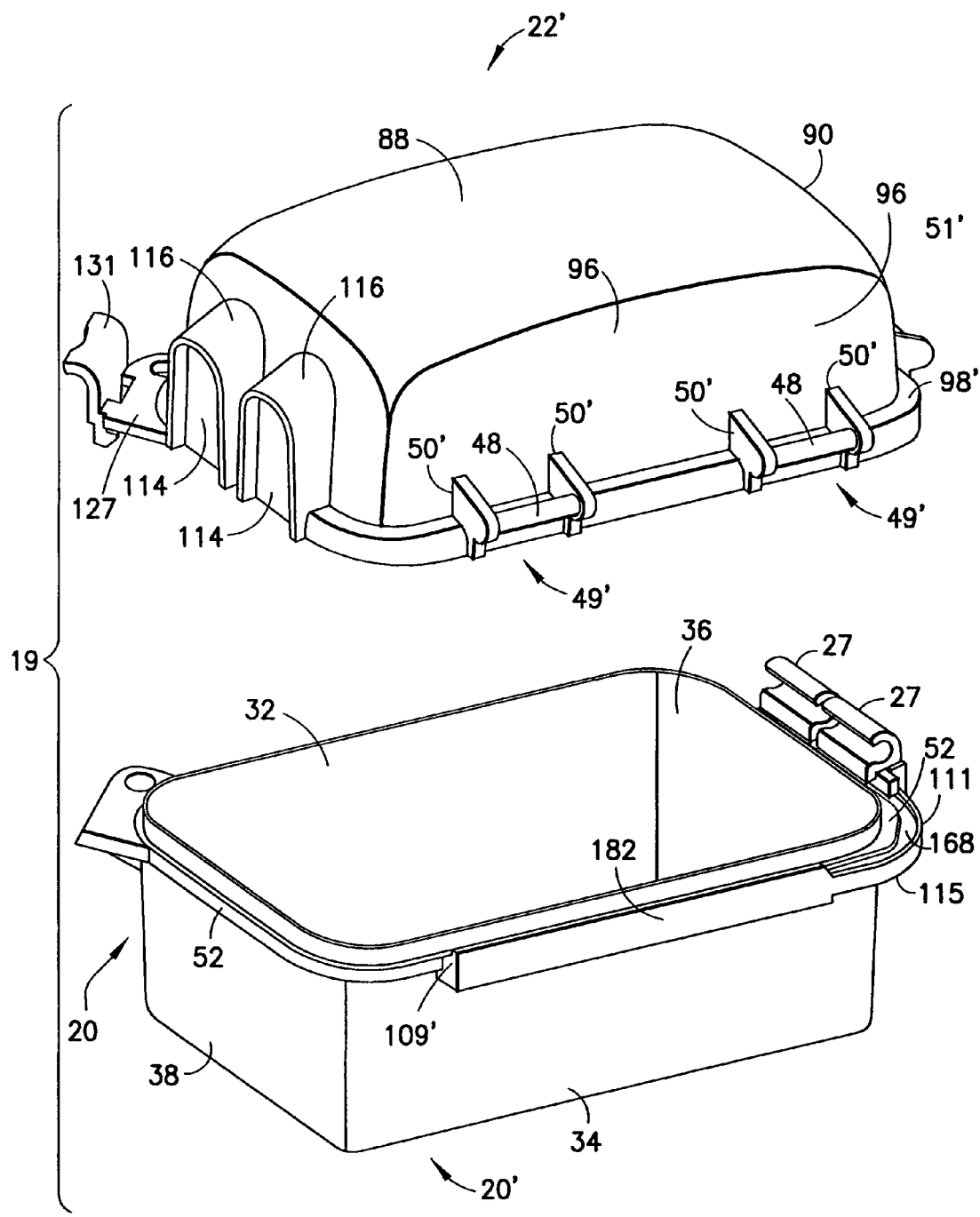
FIG. 19 is a front perspective view of an alternate embodiment of an enclosure embodying features of the present invention.

An alternate embodiment of an enclosure 19' embodying features of the present invention is shown in FIG. 19. The enclosure 19' comprises a cover 22' and base 20' that are pivotably joined by hinge clips 27. In this alternate embodiment, a first pair of hinge assemblies 49' and a second pair of hinge assemblies 51' are mounted on the cover 22' rather than the base as in the enclosures previously discussed above (hereafter, "previous enclosures"). Further, unlike previous enclosures, in this alternate embodiment, a top base mounting rail 180 and a side base mounting rail 182 are positioned on the base 20' instead of having a top mounting rail 100 and a side mounting rail 104 positioned on the cover 22 as in previous enclosures. See, e.g., FIGS. 2A and 2B. Nevertheless, except for these differences and the differences discussed below, the enclosure 19' shown in FIG. 19 is otherwise similar to and functions largely in the same manner as the previous enclosures.

Figure 21:
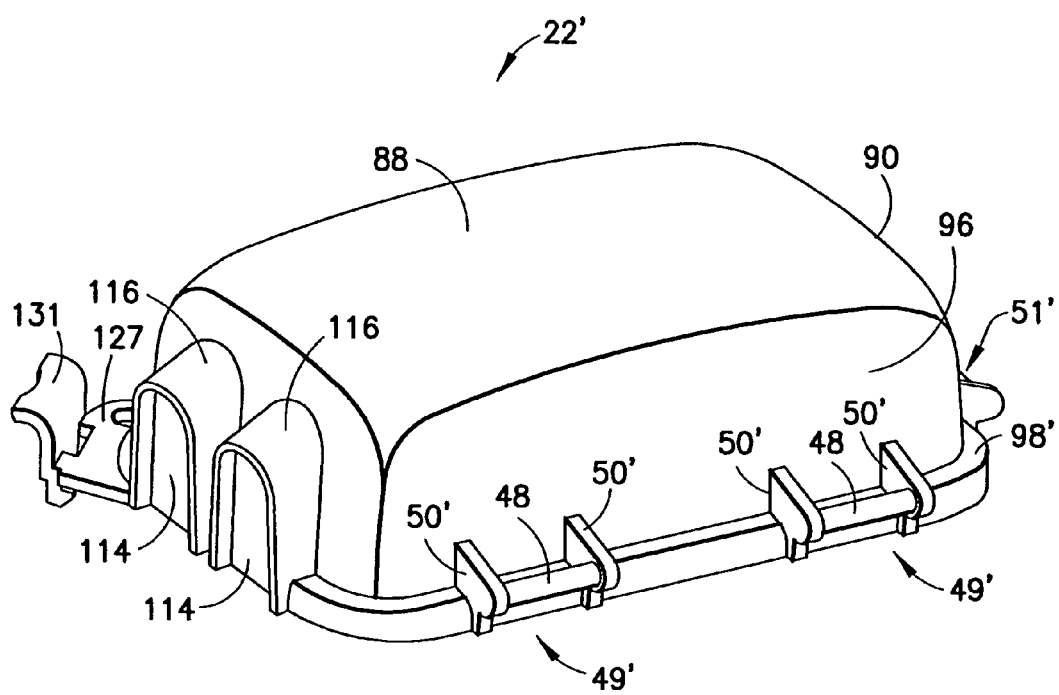
FIG. 21 is a front perspective view of a cover for use with the enclosure of FIG. 19.

The cover 22' has a cover flange 98' (see, FIGS. 19 and 21) that is similar to and which functions largely in the same manner as the cover flange 98 of previous enclosures. See, e.g., FIGS. 2A, 2B and 11. The first pair of hinge assemblies 49' are positioned collinearly along the cover flange 98' at a location adjacent to an outer surface of the left side cover wall 96 (i.e., the hinge-side cover wall). The first pair of hinge assemblies may, alternatively, be mounted adjacent to the right side cover wall. The second pair of hinge assemblies 51' are positioned collinearly on the cover flange 98' adjacent an outer surface of the top cover wall 90. The hinge assemblies 49' and 51' are permanently affixed to the cover and, preferably, are molded with the base 22' to form a unitary structure. The hinge assemblies 49', 51' comprise a hinge pin 48 disposed parallel to the adjacent cover wall. Each end of the hinge pin is mounted on an arm 50' that extends perpendicularly from an outer surface of the cover flange 98' and adjacent cover wall.

While the cover 22' has two pairs of hinge assemblies 49' and 51' (see, FIGS. 19 and 21) that are respectively disposed adjacent to the hinge-side cover wall and the top cover wall, it is to be understood that a cover having only one hinge assembly or more than two hinge assemblies disposed on the top and/or hinge-side cover wall is within the spirit of the present invention. Further, the hinge assemblies comprising a pair may be laterally spaced apart from each other as shown by the first pair of hinge assemblies 49' or, alternatively, may be positioned immediately adjacent to each other so that the inboard end of the hinge pins 48 are mounted on a common arm, in a manner similar to the second pair of hinge assemblies 51 of the previous enclosures. See, e.g., FIG. 10A.

The base 22' has a base lip 52 (see, FIGS. 19 and 20) that is similar to and which functions largely in the same manner as the base lip 52 of previous enclosures. See, e.g., FIGS. 10A and 11. The base lip 52 has a lip extension 168 that extends from an outer edge of the base lip and which is co-planar with the base lip. The lip extension 168 runs along a periphery of the base lip from the top of the base 20' and down a side of the base that would be adjacent to a hinge mounting when the cover is in the closed position, in this particular embodiment, the side base wall 34.

Figure 20:
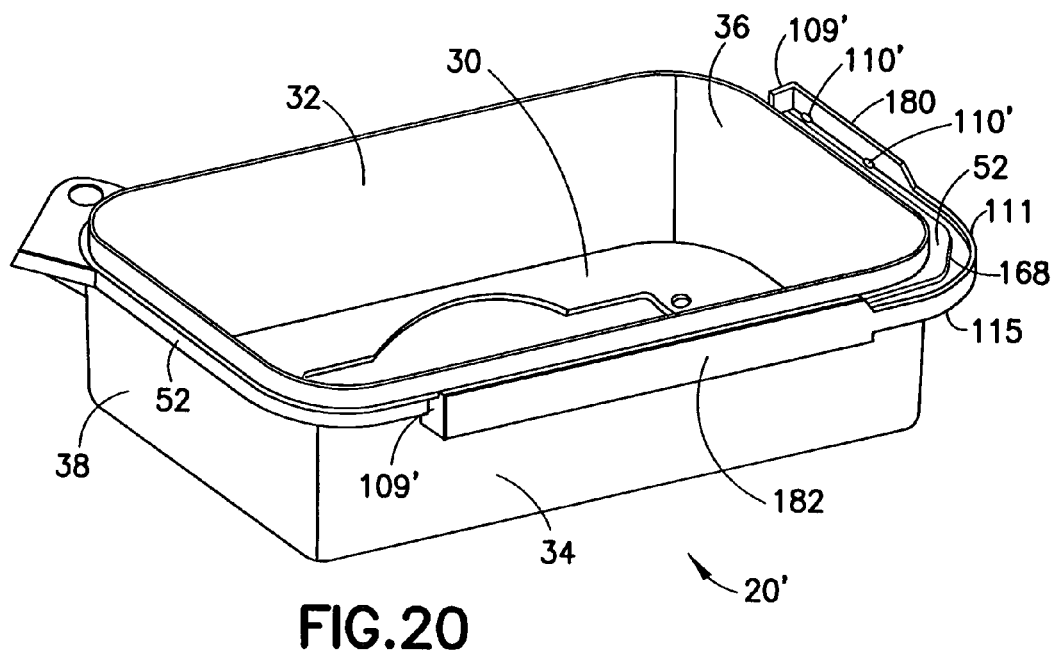
FIG. 20 is a front perspective view of a base for use with the enclosure of FIG. 19.

Referring to FIGS. 19 and 20, the top base mounting rail 180 is positioned adjacent to the top base wall and is disposed perpendicular to and running parallel with an outer edge of the lip extension 168. The side base mounting rail 182 is positioned adjacent to the hinge-side base wall, in this particular embodiment, the side base wall 34, and is disposed perpendicular to and running parallel with an outer edge of the lip extension 168. The upper portion of base mounting rails 180 and 182 extend above an adjacent upper surface of the lip extension 168 and the lower portion of base mounting rails 180 and 182 extend below an adjacent lower surface of the lip extension. Base mounting rails 180 and 182 have a rail flange 109' at their non-corner ends, that is, the end of base mounting rails 180 and 182 that are opposite from the corner where the top base wall 36 and hinge-side base wall, (i.e. base side wall 34) meet to form a corner. The rail flange 109' extends perpendicularly from the non-corner end of each mounting rail to a border or point where the base lip 52' and lip extension 168 adjoin each other. The rail flange 109' provides support to base mounting rails 180 and 182 and prevents the hinge clips 27 from inadvertently slipping off the base mounting rails.

The upper portion of top base mounting rail 180 is separated from the upper portion of side base mounting rail 182 by an elongated cutout or upper notch 111 (see, FIGS. 19, 20). The upper notch 111 is located along the upper surface of the lip extension that is adjacent to and running parallel with a corner where the top base wall 34 and the hinge-side base wall, (i.e., base side wall 36) meet to form a corner. The lower portion of top base mounting rail 180 is separated from the lower portion of side base mounting rail 182 by a lower notch 115. The lower notch is located along the lower surface of the lip extension and disposed immediately below and running parallel with upper notch 108. The upper notch 111 and lower notch 115 coact with each other to provide an entry point for attaching the clip 27 to the base 22' and to provide room for the clip to slide around the corner of the base as the clip is being moved from one position to another. Stops 110' (see, FIG. 19B) are positioned along an inner surface of base mounting rails 180 and 182 at locations that would be adjacent to hinge assemblies when the cover is in the closed position. The stops 110' are similar to and function largely in the same manner as the stops 110 of the previous enclosures. See, e.g., FIGS. 4A and 4B.

Figure 22:
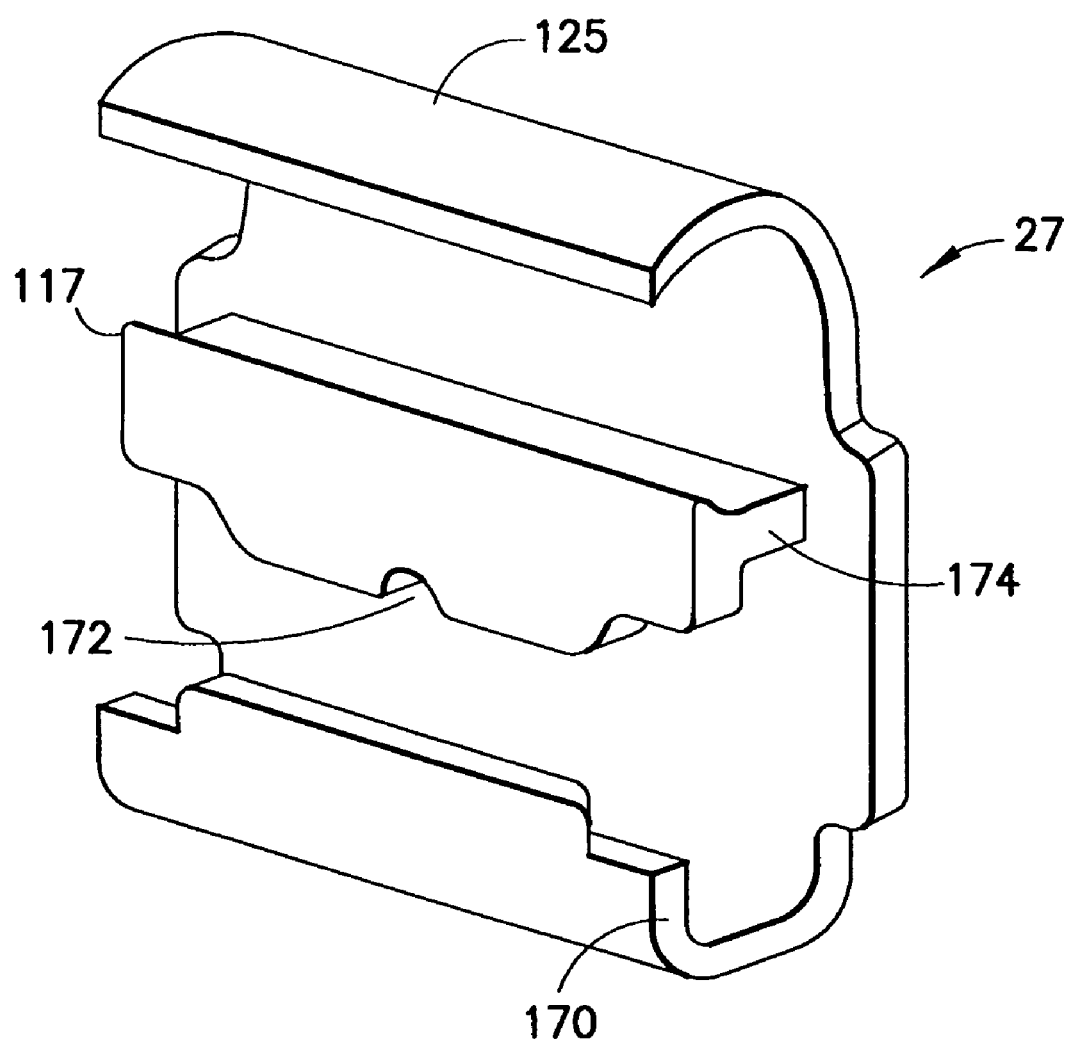
FIG. 22 is a rear perspective view of a hinge clip for use with the enclosure of FIG. 19.

The hinge clip 27 has a generally rectangular shaped structure. See, FIG. 22. The hinge clip is constructed using conventional methods (e.g., machining or molding) and may be made from a material suitable for use in an enclosure (e.g. plastic or composites). At the top end of the clip 27 is a generally semi-circular pin hook 125 that is disposed facing inwards. The pin hook 125 connects or engages the clip 27 to the hinge pin 48'. The clip 27 also has an upper rail hook 174 and a lower rail hook 170. The generally U-shaped lower rail hook 170 is positioned at the bottom end of the clip 27 and is disposed facing the pin hook. The rail lower rail hook engages the lower portion of the top or side base mounting rails 180, 182. See FIG. 19. The generally U-shaped upper rail hook 174 is positioned at a distance away from and facing the lower rail hook 170. The upper rail hook engages the upper portion of the top or side base mounting rails 180, 182 to help keep the clip in place. Preferably, the upper rail hook 174 has a notched ridge 172 at a distal edge thereof. The notched ridge is dimensioned to snap fit over the stop 110' so as to keeps the clip 27 in place. The rail hook 174 also has a small ridge 117' running along an outside surface of the rail hook adjacent to and running parallel with a distal end of the pin hook 125. The small ridge 117' coacts with the pin hook 125 to allow the pin hook to snap fit onto the hinge pin 48.

The clip 27 is attached to the base in a manner similar to the clips 26 of previous enclosures See, e.g., FIGS. 2A, 2B, 4A and 4B. If it is desired that the cover opens upwards, the clips 27 are attached to the upper portion of the top base mounting rail 180 by slipping the upper rail hook 174 over the upper portion of the top base mounting rail via the upper notch 111 while at the same time slipping the lower rail hook 170 over the lower portion of the top base mounting rail 180 via the lower notch 115. The clips are then slid sideways to snap fit into the appropriate hinge stops 110'. If it is desired that the cover pivots open sideways, the clips are attached to the side base mounting rail 182 by slipping the upper rail hook 174 over the upper portion of the side base mounting rail 182 via the upper notch 111 while at the same time slipping the lower rail hook 170 over the lower portion of the side base mounting rail 182 via the lower notch 115. The clips are then slid downwards to snap fit into the appropriate hinge stops 110'.

After the clips 27 are attached to the base 20', the cover 22' is attached to the base by hooking the pin hook 125 onto the corresponding hinge pin 48' on the cover. See, FIG. 19. To change the direction of opening of the cover 22', the cover is unhooked from the hinge pins 48', and the positioning of the clips 27 are changed by sliding off the clips from one mounting rail, then sliding the clips around the corner of the base via the upper and lower notch 111, 115 and then slipping the clips onto the other mounting rail so as to snap fit into the appropriate stops 110'. This is similar to moving the clips 26 of previous enclosures from one mounting rail to the other mounting rail. See, e.g., FIGS. 4A and 4B.

Although the invention has been described with reference to preferred embodiments, it will be appreciated by one of ordinary skill in the art that numerous modifications are possible in light of the above disclosure. For example, the cover may have multiple cable openings instead of just two openings each on the side and bottom. In addition, the cover may have a semi-tubular or other shape instead of a box-like shape. The entire enclosure itself may have an oval, square shape or other shape instead of having a rectangular shape. All such variations and modifications are intended to be within the scope and spirit of the invention.

What is claimed is:

1. A weatherproof electrical enclosure comprising:
   a base;
   a cover; and
   a first adjustable position hinge clip slidably attached to the base or the cover for pivotably connecting the base to the cover, and allowing the cover to pivot open either vertically or horizontally.

2. The enclosure of claim 1, wherein the enclosure is dimensioned for use with a single gang receptacle.

3. The enclosure of claim 1, wherein the enclosure is dimensioned for use with a double gang receptacle.

4. The enclosure of claim 1, wherein the cover is transparent.

5. The enclosure of claim 1, further comprising a gasket for promoting a weatherproof seal between the base and a support structure.

6. The enclosure of claim 5, wherein the base comprises a rear wall, and further, wherein the gasket is affixed to an outer surface of the rear wall.

7. The enclosure of claim 1, wherein the base comprises a top base wall, a bottom base wall, two side base walls, and a rear wall, wherein the top, bottom and side base walls define a base opening and further, wherein the cover comprises a front cover wall, a top cover wall, a bottom cover wall and two side cover walls, wherein the top, bottom and side cover walls define a cover opening.

8. The enclosure of claim 7, further comprising at least one cable opening disposed on the bottom cover wall.

9. The enclosure of claim 8, wherein the at least one cable opening is covered by a removable cable cap.

10. The enclosure of claim 8, wherein the at least one cable opening is shielded by a hood.

11. The enclosure of claim 7, further comprising at least one cable opening disposed on a side cover wall.

12. The enclosure of claim 11, wherein the at least one cable opening is covered by a removable cable cap.

13. The enclosure of claim 11, wherein the at least one cable opening is shielded by a hood.

14. The enclosure of claim 7, further comprising:
   a base lip extending perpendicular to and outwards from forward edges of the top, bottom and side base walls; and
   an L-shaped cover flange extending perpendicular to and outwards from rear edges of the top, bottom and side cover walls, wherein a distal end of the cover flange extends rearwards and further, wherein the cover flange is dimensioned to complement the base lip to form a waterproof seal when the cover is in a closed position.

15. The enclosure of claim 14, further comprising a cover lip adjoining an outer surface of the distal end of the cover flange, wherein the cover lip runs along a periphery of the cover flange and further, wherein the cover lip is dimensioned to overlap the base lip when the cover is in the closed position.

16. The enclosure of claim 15, further comprising:
   a base flange disposed perpendicular to an upper surface of the base lip and running along a periphery of the base opening;
   a tongue disposed perpendicular to the upper surface of the base lip at a distance outwards from the base flange and running along the periphery of the base opening; and
   a groove positioned on an edge of the distal end of the cover flange adjacent to a border where the cover lip adjoins the cover flange, wherein the groove runs parallel to the cover opening and further,
   wherein the tongue form fits the groove to form a first watertight seal and an outer surface of the base flange lies in surface-to-surface engagement with an inner surface of the distal end of the cover flange to form a second watertight seal when the cover is in the closed position.

17. The enclosure of claim 15, further comprising:
   a first hinge assembly positioned on an outer surface of the top base wall;
   a second hinge assembly positioned on an outer surface of a hinge-side base wall;
   a top mounting rail positioned perpendicular to a front surface of the cover flange adjacent and parallel to an outer surface of the top cover wall; and
   a side mounting rail positioned perpendicular to the front surface of the cover flange adjacent and parallel to an outer surface of a hinge-side cover wall.

18. The enclosure of claim 17, wherein the hinge clip comprises:
   a rail hook positioned at a top end of the hinge clip and disposed facing inwards;
   a pin hook positioned at a bottom end of the hinge clip and disposed facing the rail hook; and
   a lip hook positioned at a distance from the rail hook and disposed facing the rail hook.

19. The enclosure of claim 18, further comprising:
   a first hinge stop positioned along an inner surface of the top mounting rail;
   a second hinge stop positioned along an inner surface of the side mounting rail; and
   a notched ridge disposed at a distal edge of the rail hook, wherein the notched ridge is dimensioned to snap fit the first and second hinge stop.

20. The enclosure of claim 17, further comprising:
   a first rail flange extending perpendicularly from a non-corner end of the top mounting rail to the outer surface of the top cover wall; and
   a second rail flange extending perpendicularly from a non-corner end of the side mounting rail to the outer surface of the hinge-side cover wall.

21. The enclosure of claim 17, wherein the top mounting rail and the side mounting rail are separated by an upper notch disposed adjacent to and running parallel with a corner where the top cover wall and hinge-side cover wall meet and further, wherein an inner surface of the cover lip has a lower notch running parallel to the upper notch.

22. The enclosure of claim 17, further comprising:
   a second adjustable position hinge clip;
   a third hinge assembly positioned on the outer surface of the top base wall and disposed collinear with the first hinge assembly; and a fourth hinge assembly positioned on the outer surface of the hinge-side base wall and disposed collinear with the second hinge assembly.

23. The enclosure of claim 7, further comprising a latch mechanism for keeping the cover in a closed position, the latch mechanism comprising:
a base tab extending outwards from an outer surface of the base adjacent to the base opening;
a hook assembly comprising an L-shaped latch flange extending outwards from an outer surface of the cover adjacent to the cover opening, wherein a distal end of the latch flange extends rearwards and further, wherein the latch flange extends outwards from the cover at a distance sufficient to allow the distal end of the latch flange to engage the base tab when the cover is in the closed position.

24. The enclosure of claim 23, wherein the latch mechanism further comprises a locking assembly comprising an upper padlock hole disposed in the latch flange and a lower padlock hole disposed in the base tab, wherein the upper and lower padlock holes register with each other when the cover is in the closed position.

25. The enclosure of claim 7, further comprising a latch mechanism for keeping the cover in a closed position, the latch mechanism comprising:
a base tab extending outwards from an outer surface of the base adjacent to the base opening;
a hook assembly comprising a latch flange extending outwards from an outer surface of the cover adjacent to the cover opening and a locking clip pivotably mounted along a distal end of the latch flange perpendicular to the latch flange, wherein the latch flange extends from the cover at a distance sufficient to allow the locking clip to engage the base tab when the cover is in the closed position.

26. The enclosure of claim 25, wherein the latch mechanism further comprises a locking assembly comprising an upper padlock hole disposed in the latch flange and a lower padlock hole disposed in the base tab, wherein the upper and lower padlock holes register with each other when the cover is in the closed position.

27. The enclosure of claim 1, further comprising a cover plate, the cover plate comprising:
an upper recess disposed on a top corner:
a first horizontally elongated mounting hole disposed on an opposite top corner;
a lower recess disposed on a bottom corner diagonally opposite from the top corner where the upper recess is disposed; and
a second horizontally elongated mounting hole disposed on an opposite bottom corner.

28. The enclosure of claim 27, wherein the cover plate further comprises a set of removable ribs, the set of removable ribs comprising:
a center rib disposed at about the center of the cover plate, wherein removal of the center rib creates a first rectangular opening;
a pair of generally circular shaped aperture ribs having a flat top portion and a flat bottom portion, the pair of aperture ribs comprising a first aperture rib disposed above the center rib, wherein a portion of a top end of the center rib extends into a bottom end of the first aperture rib and a second aperture rib disposed below the center rib, wherein a portion of a bottom end of the center rib extends into a top end of the second aperture rib;
a pair of insert ribs comprising a first insert rib disposed on the first aperture rib and a second insert rib disposed on the second aperture rib, wherein removal of the center rib, aperture ribs and insert ribs creates a first circular opening, a second circular opening and an insert space;
a pair of side ribs comprising a first side rib disposed on a side of the center rib and a second side rib disposed on an opposite side of the center rib; and
a first, second, third and fourth corner rib, wherein the first and second corner ribs are respectively positioned on opposite ends of the top of the first aperture rib and the third and fourth corner ribs are respectively positioned on opposite ends of the bottom of the second aperture rib and further, wherein removal of the center rib, aperture ribs, insert ribs, side ribs and corner ribs creates a second rectangular opening.

29. The enclosure of claim 28, wherein each side rib has a slot disposed adjacent and perpendicular to the center rib and the insert ribs have an ear disposed on each side thereof and further, wherein the slots and ears are dimensioned to snap fit together.

30. The enclosure of claim 27, wherein the cover plate further comprises:
a circular opening disposed at about the center of the cover plate; and
a set of removable concentric ribs, the set of removable ribs comprising at least one removable concentric rib, wherein removal of the concentric rib increases the size of the opening.

31. A weatherproof electrical enclosure comprising:
a base mountable on a support structure, the base comprising a top base wall, a bottom base wall, two side base walls, and a rear wall;
an adjustable-position cover comprising a front cover wall, a top cover wall, a bottom cover wall and two side cover walls; and
an adjustable position hinge clip slidably attached to the base or cover for pivotably connecting the base to the cover, and allowing the cover to pivot open either vertically or horizontally.

32. The enclosure of claim 31, further comprising a cover plate, the cover plate comprising a set of removable ribs, the set of removable ribs comprising:
a center rib disposed at about the center of the cover plate, wherein removal of the center rib creates a first rectangular opening;
a pair of generally circular shaped aperture ribs having a flat top portion and a flat bottom portion, the pair of aperture ribs comprising a first aperture rib disposed above the center rib, wherein a portion of a top end of the center rib extends into a bottom end of the first aperture rib and a second aperture rib disposed below the center rib, wherein a portion of a bottom end of the center rib extends into a top end of the second aperture rib;
a pair of insert ribs comprising a first insert rib disposed on the first aperture rib and a second insert rib disposed on the second aperture rib, wherein removal of the center rib, aperture ribs and insert ribs creates a first circular opening, a second circular opening and an insert space;
a pair of side ribs comprising a first side rib disposed on a side of the center rib and a second side rib disposed on an opposite side of the center rib; and
a first, second, third and fourth corner rib, wherein the first and second corner ribs are respectively positioned on opposite ends of the top of the first aperture rib and the third and fourth corner ribs are respectively positioned on opposite ends of the bottom of the second aperture rib and further, wherein removal of the center rib, aperture ribs, insert ribs, side ribs and corner ribs creates a second rectangular opening.

33. The enclosure of claim 32, wherein the cover plate further comprises an upper recess disposed on a top corner, a first horizontally elongated mounting hole disposed on an opposite top corner, a lower recess disposed on a bottom corner diagonally opposite from the top corner where the upper recess is disposed, and a second horizontally elongated mounting hole disposed on an opposite bottom corner.

34. The enclosure of claim 31, further comprising a first cable opening positioned on the bottom cover wall and a second cable opening positioned on a side cover wall.

35. The enclosure of claim 34, wherein the first and second cable openings are each covered by a removable cable cap and shielded by a hood.

36. The enclosure of claim 31, further comprising:
a base lip extending perpendicular to and outwards from forward edges of the top, bottom and side base walls;
an L-shaped cover flange extending perpendicular to and outwards from rear edges of the top, bottom and side cover walls, wherein a distal end of the cover flange extends rearwards and further, wherein the cover flange is dimensioned to complement the base lip to form a waterproof seal when the cover is in a closed position.

37. The enclosure of claim 36, further comprising:
a first hinge assembly positioned on an outer surface of the top cover wall;
a second hinge assembly positioned on an outer surface of a hinge-side cover wall;
a lip extension extending from an outer edge of the base lip co-planar with the base lip, the lip extension running along a periphery of the base lip from a top of the base and down a side of the base adjacent to a hinge-side base wall;
a top base mounting rail positioned adjacent to the top base wall perpendicular to and running parallel with an outer edge of the lip extension;
a side base mounting rail positioned adjacent to a hinge-side base wall perpendicular to and running parallel with the outer edge of the lip extension.

38. The enclosure of claim 37, wherein the hinge clip comprises:
a pin hook positioned at a top end of the hinge clip and disposed facing inwards;
a lower rail hook positioned at a bottom end of the hinge clip and disposed facing the pin hook; and
an upper rail hook positioned at a distance from the lower rail hook and disposed facing the lower rail hook.

39. The enclosure of claim 36, further comprising:
a first hinge assembly positioned on an outer surface of the top base wall;
a second hinge assembly positioned on an outer surface of a hinge-side base wall;
a top mounting rail positioned perpendicular to a front surface of the cover flange adjacent and parallel to an outer surface of the top cover wall; and
a side mounting rail positioned perpendicular to the front surface of the cover flange adjacent and parallel to an outer surface of a hinge-side cover wall.

40. The enclosure of claim 39, wherein the hinge clip comprises:
a rail hook positioned at a top end of the hinge clip and disposed facing inwards;

a pin hook positioned at a bottom end of the hinge clip and disposed facing the rail hook; and
a lip hook positioned at a distance from the rail hook and disposed facing the rail hook.

41. The enclosure of claim 31, further comprising a latch mechanism for keeping the cover in a closed position, the latch mechanism comprising:
a base tab extending outwards from an outer surface of the base adjacent to the base opening;
a hook assembly comprising a latch flange extending outwards from an outer surface of the cover adjacent to the cover opening and a locking clip pivotably mounted along a distal end of the latch flange perpendicular to the latch flange, wherein the latch flange extends from the cover at a distance sufficient to allow the locking clip to engage the base tab when the cover is in the closed position.

42. The enclosure of claim 41, wherein the latch mechanism further comprises a locking assembly comprising an upper padlock hole disposed in the latch flange and a lower padlock hole disposed in the base tab, wherein the padlock holes register with each other when the cover is in the closed position.

43. A hinge apparatus suitable for use in an electrical enclosure having a cover and a base, the hinge apparatus comprising:
a first hinge mounting disposed on an outer surface of a top the base;
a second hinge mounting disposed on an outer surface of a side of the base;
a first mounting rail disposed on an outer surface of a top of the cover;
a second mounting rail disposed on an outer surface of a side of the cover; and
a movable hinge clip for pivotably connecting the cover to the base, the hinge clip comprising a first hook disposed at a top end of the hinge clip for attaching the top end of the hinge clip to the first or second mounting rail and a second hook disposed at a bottom end of the hinge clip for attaching the bottom end of the hinge clip to the first or second hinge mounting.

44. A cover plate suitable for use with a weatherproof electrical enclosure, the cover plate comprising:
a generally rectangular substrate having a generally planar surface, wherein a top corner of the substrate is cut away to form a first arcuate cut-out section and further, wherein a bottom corner of the substrate diagonally opposite from the first arcuate cut-out section is cut away to form a second arcuate cut-out section;
a first horizontally elongated mounting hole horizontally disposed onto substrate at a point adjacent to an opposite top corner of the substrate;
a second horizontally elongated mounting hole horizontally disposed on the substrate at a point adjacent to an opposite bottom corner of the substrate;
a center rib disposed at about the center of the cover plate, wherein removal of the center rib creates a first rectangular opening;
a pair of generally circular shaped aperture ribs having a flat top portion and a flat bottom portion, the pair of aperture ribs comprising a first aperture rib disposed above the center rib, wherein a portion of a top end of the center rib extends into a bottom end of the first aperture rib and a second aperture rib disposed below the center rib, wherein a portion of a bottom end of the center rib extends into a top end of the second aperture rib;

a pair of generally square shaped insert ribs comprising a first insert rib disposed on the first aperture rib and a second insert rib disposed on the second aperture rib, wherein removal of the center rib, aperture ribs and insert ribs creates a first circular opening, a second circular opening and an insert space;

a pair of generally trapezoidal shaped side ribs comprising a first side rib disposed on a side of the center rib and a second side rib disposed on an opposite side of the center rib; and a first, second, third and fourth generally triangular shaped corner rib, wherein the first and second corner ribs are respectively positioned on opposite ends of the top of the first aperture rib and the third and fourth corner ribs are respectively positioned on opposite ends of the bottom of the second aperture rib and further, wherein removal of the center rib, aperture ribs, insert ribs, side ribs and corner ribs creates a second rectangular opening.

45. The cover plate of claim 44, wherein each side rib has a slot disposed adjacent and perpendicular to the center rib and the insert ribs have an ear on each side and further, wherein the slots and cars are dimensioned to snap fit together.

\* \* \* \* \*

UNITED STATES PATENT AND TRADEMARK OFFICE
CERTIFICATE OF CORRECTION

PATENT NO. : 6,979,777 B2
DATED : December 27, 2005
INVENTOR(S) : Jean Claude Marcou et al.

It is certified that error appears in the above-identified patent and that said Letters Patent is hereby corrected as shown below:

<u>Column 22,</u>
Line 10, claim 45 should read as follows:
-- The cover plate of claim 44, wherein each side rib has a slot disposed adjacent and perpendicular to the center rib and the insert ribs have an ear on each side and further, wherein the slots and ears are dimensioned to snap fit together. --.

Signed and Sealed this

Twenty-first Day of March, 2006

JON W. DUDAS
*Director of the United States Patent and Trademark Office*